(12) United States Patent
Winston et al.

(10) Patent No.: US 9,039,213 B2
(45) Date of Patent: May 26, 2015

(54) LIGHT CONCENTRATION APPARATUS, SYSTEMS AND METHODS

(71) Applicant: The Regents of the University of California, Oakland, CA (US)

(72) Inventors: Roland Winston, Merced, CA (US); Weiya Zhang, Merced, CA (US); Kevin Michael Balkoski, Merced, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/967,278

(22) Filed: Aug. 14, 2013

(65) Prior Publication Data

US 2013/0329308 A1    Dec. 12, 2013

Related U.S. Application Data

(63) Continuation-in-part of application No. 12/846,729, filed on Jul. 29, 2010, now Pat. No. 8,684,545.

(60) Provisional application No. 61/230,083, filed on Jul. 30, 2009, provisional application No. 61/230,485, filed on Jul. 31, 2009.

(51) Int. Cl.
*G02B 5/10* (2006.01)
*G02B 5/08* (2006.01)
(Continued)

(52) U.S. Cl.
CPC  *G02B 17/08* (2013.01); *G02B 5/10* (2013.01); *F24J 2/12* (2013.01); *G02B 19/0042* (2013.01); *G02B 3/08* (2013.01); *G02B 5/1876* (2013.01);
(Continued)

(58) Field of Classification Search
CPC .......... G02B 3/08; G02B 5/10; G02B 5/1876; G02B 17/08; G02B 19/0028; G02B 19/0042; G02B 19/0076; F24J 2/12
USPC .................................................. 359/851, 853
See application file for complete search history.

(56) References Cited

U.S. PATENT DOCUMENTS 4,069,812 A    1/1978  O'Neill
4,242,580 A   12/1980  Kaplow et al.
(Continued)

FOREIGN PATENT DOCUMENTS

CN          2318710 Y       5/1999
CN          1453524 A      11/2003
(Continued)

OTHER PUBLICATIONS

Benitez, P. et al. (2010) "High Performance Fresnel-based Photovoltaic Concentrator," Optics Express 10(S1)1-16.
(Continued)

*Primary Examiner* — William Choi
(74) *Attorney, Agent, or Firm* — Foley & Lardner LLP; Antoinette F. Konski

(57) ABSTRACT

An optical device is disclosed including: a non-imaging secondary concentrator having an entry aperture and an exit aperture, and configured to receive light focused by a primary focusing element from a source onto the entry aperture. The non-imaging secondary concentrator includes: a first portion proximal the entry aperture; and a second portion proximal the exit aperture which is not rotationally symmetric about an optic axis. The optical device further comprises a means for homogenizing the light focused onto the entry aperture of the secondary concentrator.

48 Claims, 33 Drawing Sheets

(51) Int. Cl.
*G02B 17/08* (2006.01)
*F24J 2/12* (2006.01)
*G02B 19/00* (2006.01)
G02B 3/08 (2006.01)
G02B 5/18 (2006.01)

(52) U.S. Cl.
CPC ........ *G02B 19/0028* (2013.01); *G02B 19/0076* (2013.01)

(56) References Cited

U.S. PATENT DOCUMENTS

| | | | |
|---|---|---|---|
| 4,741,613 | A | 5/1988 | Vanderwerf |
| 4,830,678 | A | 5/1989 | Todorof et al. |
| 5,243,459 | A | 9/1993 | Winston et al. |
| 5,540,216 | A | 7/1996 | Rasmusson |
| 5,560,700 | A | 10/1996 | Levens |
| 6,123,436 | A | 9/2000 | Hough et al. |
| 6,225,551 | B1 | 5/2001 | Lewandowski et al. |
| 6,313,391 | B1 | 11/2001 | Abbott |
| 6,333,458 | B1 | 12/2001 | Forrest et al. |
| 6,384,320 | B1 | 5/2002 | Chen |
| 6,639,733 | B2 | 10/2003 | Minano et al. |
| 6,730,840 | B2 | 5/2004 | Sasaoka et al. |
| 6,819,687 | B1 | 11/2004 | Fein |
| 6,896,381 | B2 | 5/2005 | Benitez et al. |
| 7,081,584 | B2 | 7/2006 | Mook |
| 7,152,985 | B2 | 12/2006 | Benitez et al. |
| 7,160,522 | B2 | 1/2007 | Minano Dominguez et al. |
| 7,181,378 | B2 | 2/2007 | Benitez et al. |
| 7,286,296 | B2 * | 10/2007 | Chaves et al. ................. 359/641 |
| 8,000,018 | B2 | 8/2011 | Benitez et al. |
| 8,026,440 | B1 | 9/2011 | Gordon |
| 8,087,245 | B2 | 1/2012 | Quero et al. |
| 8,101,855 | B2 | 1/2012 | Benitez et al. |
| 8,684,545 | B2 | 4/2014 | Winston et al. |
| 2002/0148497 | A1 | 10/2002 | Sasaoka et al. |
| 2003/0075212 | A1 | 4/2003 | Chen |
| 2003/0075213 | A1 | 4/2003 | Chen |
| 2003/0201008 | A1 | 10/2003 | Lawheed |
| 2004/0084077 | A1 | 5/2004 | Aylaian |
| 2004/0112424 | A1 | 6/2004 | Araki et al. |
| 2005/0046977 | A1 | 3/2005 | Shifman |
| 2005/0081909 | A1 | 4/2005 | Paull |
| 2005/0092360 | A1 | 5/2005 | Clark |
| 2006/0054211 | A1 | 3/2006 | Meyers |
| 2006/0104061 | A1 * | 5/2006 | Lerner et al. ................. 362/249 |
| 2006/0185713 | A1 | 8/2006 | Mook, Jr. |
| 2006/0207650 | A1 | 9/2006 | Winston et al. |
| 2006/0231133 | A1 | 10/2006 | Fork et al. |
| 2007/0227573 | A1 | 10/2007 | Hunter et al. |
| 2008/0047605 | A1 | 2/2008 | Benitez et al. |
| 2008/0087323 | A1 | 4/2008 | Araki et al. |
| 2008/0245401 | A1 | 10/2008 | Winston et al. |
| 2009/0277493 | A1 | 11/2009 | Merkle |
| 2010/0116319 | A1 | 5/2010 | Martinez Anton et al. |
| 2010/0116336 | A1 | 5/2010 | Martinez Anton et al. |
| 2010/0307586 | A1 | 12/2010 | Benitez et al. |
| 2011/0005577 | A1 | 1/2011 | Medina et al. |
| 2012/0057324 | A1 | 3/2012 | Martinez Anton |
| 2012/0132278 | A1 | 5/2012 | Winston et al. |
| 2012/0169232 | A1 | 7/2012 | Behr et al. |

FOREIGN PATENT DOCUMENTS

| | | |
|---|---|---|
| CN | 1826139 A | 11/2006 |
| JP | 2006-313809 A | 11/2006 |
| WO | WO-2006/030433 A2 | 3/2006 |
| WO | WO-2006/128417 A1 | 12/2006 |
| WO | WO-2007/016363 A2 | 2/2007 |

OTHER PUBLICATIONS

Benitez, P. et al. (2006) "High Concentration Mirror-Based Kohler Integrating System for Tandem Solar Cells," IEEE:690-693.

Buljan, M. et al. (2010) "Improving Performances of Fresnel CPV Systems: Fresnel-RXI Kohler Concentrator," 3$^{rd}$ International Workshop on CPV, Bremerhaven.

Concentrating Collectors, Power from the Sun, Chapter 9, http://powerfromthesun.net/chapter9/chapter9new.htm, downloaded Dec. 12, 2010.

Mills, D.R. et al. (2000) "Compact Linear Fresnel Reflector Solar Thermal Powerplants," Solar Energy 68(3):263-283.

International Search Report for PCT International Application No. PCT/US2006/010219, mailed Jul. 31, 2007, 2 pages.

International Search Report for PCT International Application No. PCT/US2007/063609, mailed Feb. 11, 2008, 2 pages.

International Search Report for PCT International Application No. PCT/US2008/054893, mailed Jul. 18, 2008, 2 pages.

Non-Final Office Action for U.S. Appl. No. 12/036,825, mailed Apr. 15, 2010, 11 pages.

Final Office Action for U.S. Appl. No. 12/036,825, mailed Dec. 21, 2010, 15 pages.

Non-Final Office Action for U.S. Appl. No. 12/036,825, mailed Oct. 4, 2011, 17 pages.

Final Office Action for U.S. Appl. No. 12/036,825, mailed Jun. 19, 2012, 17 pages.

Non-Final Office Action for U.S. Appl. No. 12/036,825, mailed Mar. 26, 2014, 28 pages.

Non-Final Office Action for U.S. Appl. No. 12/846,729, mailed Feb. 21, 2012, 11 pages.

Final Office Action for U.S. Appl. No. 12/846,729, mailed Oct. 11, 2012, 11 pages.

Notice of Allowance for U.S. Appl. No. 12/846,729, mailed Nov. 14, 2013, 10 pages.

* cited by examiner

Square, side, .8 Degrees

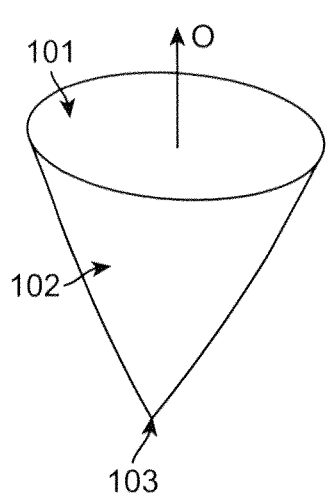
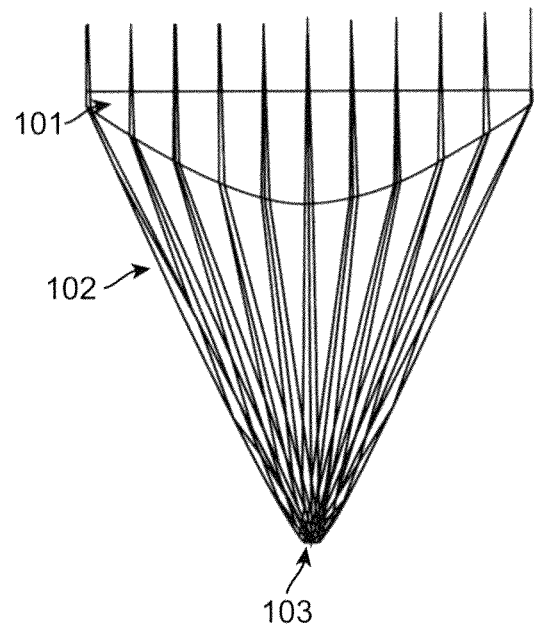
FIG. 11A  FIG. 11B
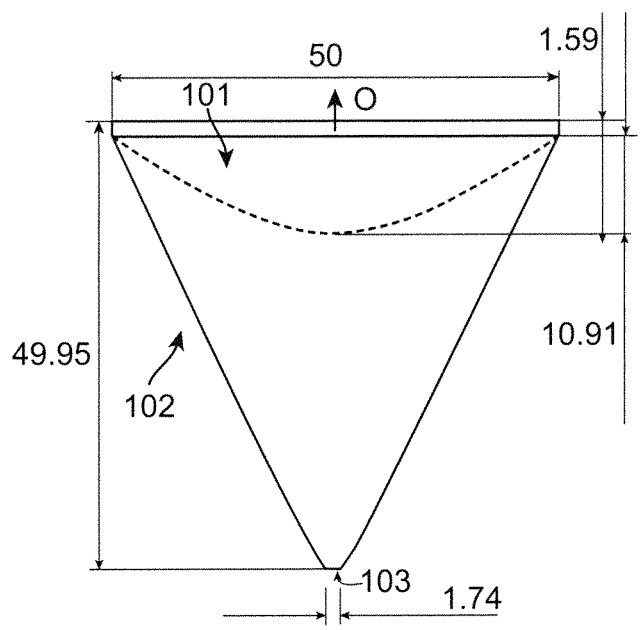
FIG. 11C

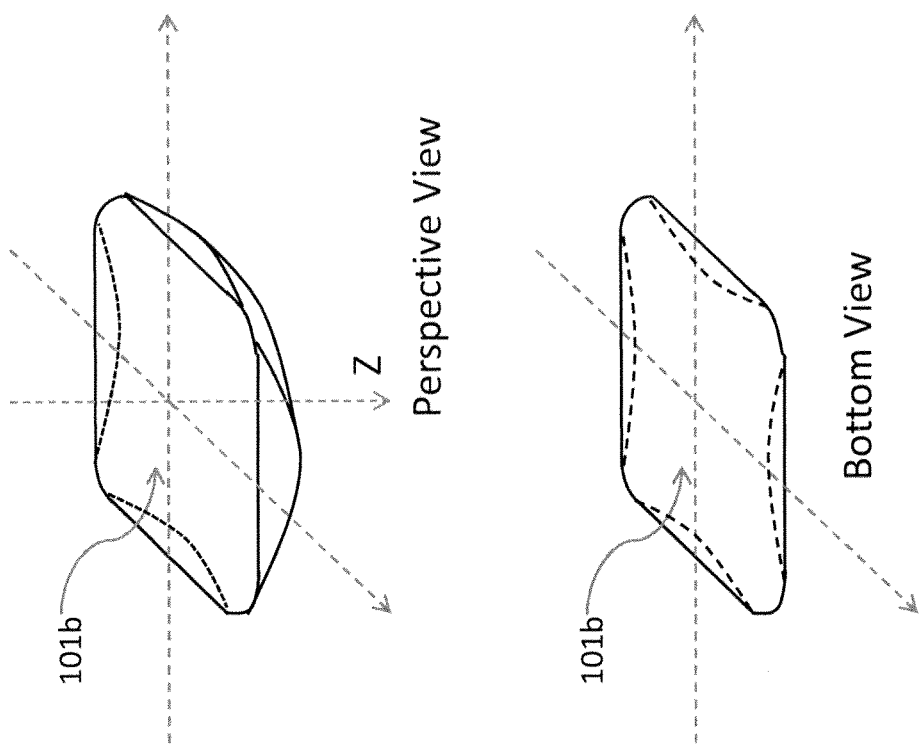

|  | Circular | Square |
|---|---|---|
| GeometricConcentration | 820 X | 820 X |
| CellSize (mm^2) | 2.4 | 1.5 |
| Acceptance Angle (Degree) | 1.6 | 1.0 |
| Optical Efficiency (without cover glass) | 85% | 84% |
| Max. Irradiance on cell (suns) (1 sun=1 mw/mm^2) | ~8,000 | ~1,100 |
| Weight per input aperture area (Kg/m^2) | 12.6 | 17.1 |

FIG. 15

-"Square 45" was measured along the diagonal of the square lens

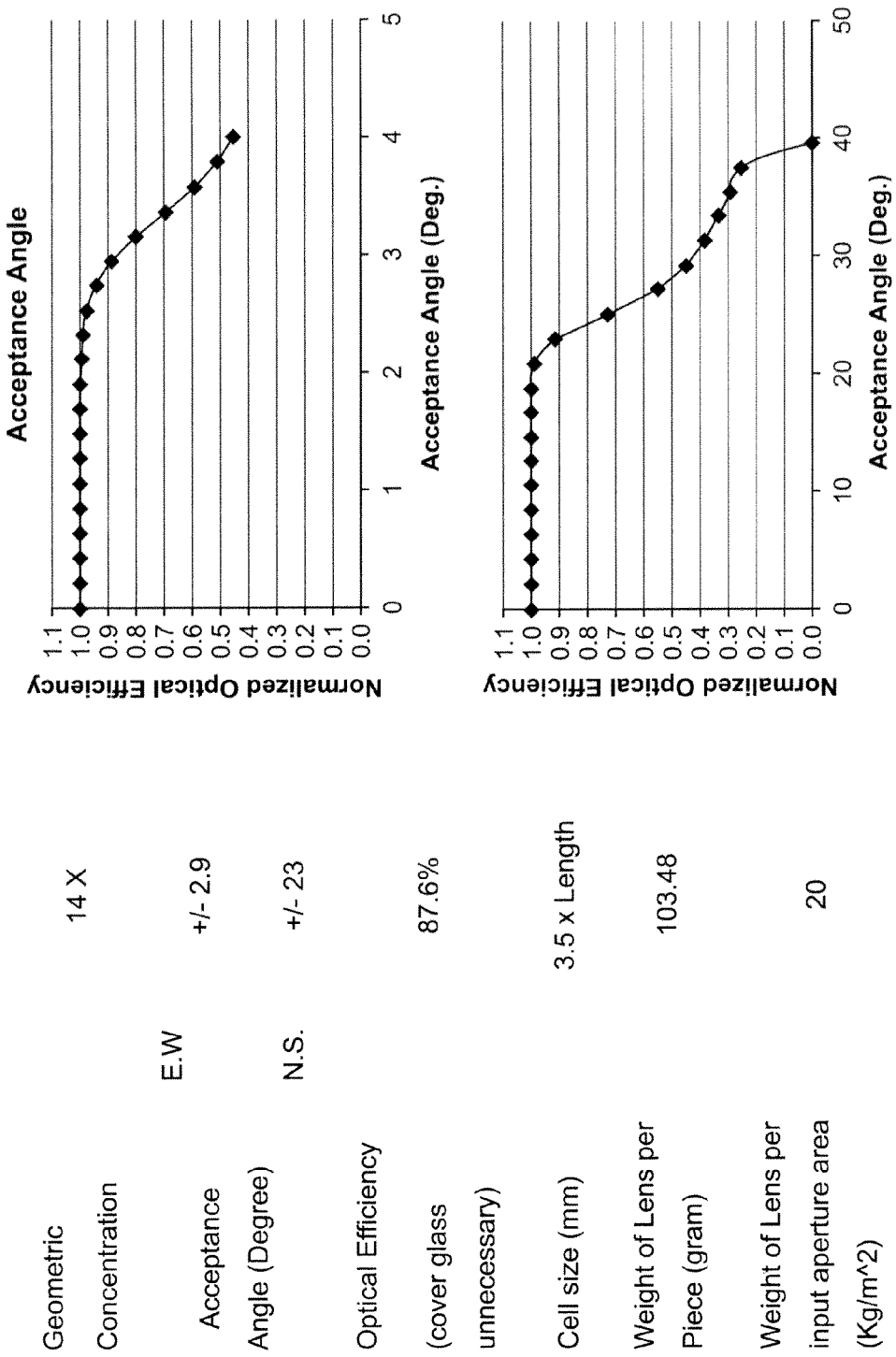

```
                    aspherical top skinOutput.sci
clear;
// Display mode
mode(0);

// Display warning for floating point exeption
ieee(1);

//****** define functions *********
//*********************************************
//*********************************************

//given two lines (y-y1)=k1*(x-x1), (y-y2)=k2*(x-x2), return joining point (x3,y3)
function [x3,y3]=linecross(x1,y1,k1,x2,y2,k2)
  x3=-(-y2+y1+k2*x2-k1*x1)/(k1-k2);
  y3=-(k1*(k2*x2-y2)+k2*y1-k1*k2*x1)/(k1-k2);
endfunction // define a conic surface,
// c: 1/R, surface curvature; k: conic constant, =0 circle, (-1,0) ellips, -1
parabola, <-1 hyperbola
// multiplyer -1 is added such that z is rightwards and the center of conic is z=0
function [z]=Conic(c,k,r)
  z=-c*r^2/(1+sqrt(1-(1+k)*c^2*r^2)):
endfunction // slone of a point of the conic surface, z is rightwards
function [kz]=slopeConic(c,k,r)
  tmp1=sqrt(1-c^2*(1+k)*r^2);
  tmp2=1+tmp1;
  kz=(-1)/(2*c*r/tmp2 + c^3*(k+1)*r^3/tmp1/tmp2^2);
endfunction //given a point and a line Ax+by+C=0, get the distanc from the point to the line
function [ds]=DistancePointToLine(x0,y0,A,B,C)
  ds=abs((A*x0+B*y0+C)/sqrt(A^2+B^2));
endfunction //given conic r coord,slope(angle) of the incident ray => solpe of refracted ray
function [kRefracted]=ConicRefraction(n0,n1,c,k,r,theta)
  NormalAngle=atan(1,1/SlopeConic(C,k,r))-%pi/2;
  IncidentAngle=NormalAngle-(theta);
  RefractedAngle=asin((n0*sin(IncidentAngle)/n1));
  krefracted=tan(NormalAngle-RefractedAngle);
endfunction //Given P1(x1,y1),P2(x2,y2), a line l goes through P2 and with slope k,
//asking for a point P3(x3,y3) on line l and
//[P1p3]=[P2P3]=L, where L is a constant.
// This function gives the smaller x3 in the two x3 solutions
function [x3,y3]=PonL2PP(x1,y1,x2,y2,k,L)
  gama=atan(k);
  t=(L^2-(x2-x1)^2-(y2-y1)^2)/(2*L-2*(x2-x1)*cos(gama)-2*(y2-y1)*sin(gama));
  x3=x2-t*cos(gama);
  y3=y2-t*sin(gama);
endfunction //Given P1(x1,y1),P2(x2,y2), a line l1 goes through P1 and with slope k1,
//a line l2 goes through P2 and with slope k2,
//asking for a point P3(x3,y3) on line l1 and
//[l2P3]+[P1P3]=L, where L is a constant and [l2P3] is the distance between P3 and
l2.
// This function gives the larger x3 in the two x3 solutinos
                                Page 1
```

FIG. 21A

```
                           aspherical top SkinOutput.sci
function [x3,y3]=PonL2PL(x1,y1,x2,y2,k1,k2,L)
  gama=atan(k1);
  t=(k2*x1-y1+y2-k2*x2-L*sqrt(k2^2+1))/(k2*cos(gama)-sin(gama)-sqrt(k2^2+1));
  x3=x1-t*cos(gama);
  y3=y1-t*sin(gama);
endfunction //***** end of defining functions ******
//**********************************************
//**********************************************

//***************************************************************** pfile=0; //weather to print to file 0:no, 1:yes
NumProfile =100;

// ***** given constant ********
n0=1;     //refractive index of  air
n1=1.5249; //refractive index of glass or other things; Schott BK270
theta2=60/180*%pi; //Max. output angle on Chip sLens=120;// side length of lens, in mm
rLens=sqrt(2)*sLens/2; // radius of lens in mm, which becomes the square lens after
trimming the edges
fNumber=1.5;
fDis=2*rLens*fNumber; //focal length of the primary lens //assuming the chip size is given, then the input aperture (acceptance angle)
follows the etendue limit
sChip=4.2; //side length of chip,in mm
rChip=sChip/2; // a circular output aperture that inner tangent the square Chip //Solve for the half entrance aperture, calculated by entendu argument
deff('[y]=fsol(x)','y=((sqrt((rLens+x)^2+fDis^2))-sqrt((rLens-x)^2+fDis^2)-n1*2*rChi
p*sin(theta2))^2');
[rInput]=fsolve(0.0001,fsol); //half entrance aperture, calculated by entendu
argument
TheoConcentr=rInput/rChip;

//************************************************************************
***********************
// Define shape of top surface
k=0; R=10.1;
c=1/R; //curvature if (1+k)>0 then  //k>-1, so it is an ellipse
  RMin=sqrt(1+k)*rInput; //minimum R value so that the conic equation has solutions
  printf('\n\nMinimum R is %f\n', RMin);
  if R<RMin then
    printf('R is adjusted to be RMin\n');
    R=RMin+10^(-8);
    c=1/R;
  end;
end //************************************************************************
***********************

// Get the height of the secondary, thus determine the coordinates of the chip
theta0=atan((rLens-rInput)/fDis); //Inclined angle of the lower edge ray
[SlopeLowerEdgeRefrac]=ConicRefraction(n0,n1,c,k,rInput,theta0); // slope of the
edge ray after refraction on top surface
                                  Page 2
```

FIG. 21B

```
                    aspherical top SkinOutput.sci
hSecondary=(rInput+rchip)/slopeLowerEdgeRefrac; // height of concentrater
//z coordinat of the top point of the input aperture, center of the curved surface
as origin
zShift=Conic(c,k,rInput);
zLens=fDis+zShift;
zchip=-hSecondary+zShift;

// String Length
lString=sqrt(fDis^2+(rInput+rLens)^2)+n1*sqrt(hSecondary^2+(rChip+rInput)^2);

// ****iteration steps***
rstep=2*rInput/(NumProfile-1);
zMarker=-10^10; //initial value for cross check
// Now start to construct the profiles
for i=1:NumProfile
 //Get the coordinates of the point at conic surface
 r=rInput-rstep*(i-1); //height of the next point in the RCR surface
 rconic(i)=r;
 zConic(i)=Conic(c,k,r); //coordinate of the point at conic surface theta=atan((rLens-rConic(i))/(zLens-zConic(i))); //incident angle of the Edge ray
 [SlopeRefl=ConicRefraction(n0,n1,c,k,r,theta); //Slope of the ray after refraction
 AngRef=atan(slopeRef); //angle of the ray after refraction // Calculate the OD that the ray needs to finish after intersecting the conic
surface
  lString1=sqrt((rConic(i)-rLens)^2+(zConic(i)-zLens)^2)*n0; //OD in air
  lString2=lString-lString1; // OD left to complete in medium
  lTarget=lString2/n1;// geometrical distance, no index n1

//String method, if theta2=90 Deg
  [x3,y3]=PonL2PP(zChip, rChip,zConic(i),rConic(i),SlopeRef,lTarget);

//Test if the angle is more than theta2
  thetaTest=atan(abs((rChip-y3)/(zchip-x3)));

//If  > theta2, Using a different string method
  if thetaTest>theta2 then
     [x3,y3]=PonL2PL(zConic(i),rConic(i),zChip,
rChip,SlopeRef,tan(%pi/2-theta2),lTarget);
     thetaTest=theta2;
  end;

//Store the profile data points
  zw(i)=x3;
  rw(i)=y3;

//Testing if any points on profile cross each other if zw(i)<zMarker then
     printf('\n warning!!! crossed at %f, %f !!!\n', i, zw(i));
  end
  zMarker=zw(i);

//Testing if TIR satisfied
  if (%pi-thetaTest-AngRef)<2*asin(1/n1) then
     printf('\n At %f, %f !!! Failed TIR\n', i , zw(i));
  end end
//*****************************************************************
```

FIG. 21C

```
                 aspherical top SkinOutput.sci
// **** Print some key parameters for lightools
printf('\n********************************\n');
//printf('theoretical concentration is %f \n',TheoConcentr);
//printf('cylinder center is %f \n',zCenter-zshift);
printf('The total length of the secondary is: %f\n', -zchip);
printf('Top thickness is %f \n',abs(zShift));
printf('surface radius is %f \n ,R);
printf('surface conic constant is %f \n',k);
printf('surfacecurvature is %f \n',c);

//**** Plot the graph *****
plot(zConic,rConic);
plot(zw,rw);
plot(zw,-rw);
set(gca(),"isoview","on");
mtlb_grid;

//**********************************************************
//if want to output to data file // light tools extrution
if pfile==1 then
// *** now write to data file ******
//output to a file
  u=file('open','.\SkinOutput.txt','unknown');
  for i=NumProfile:-1:1
    fprintf(u,'%f,%f \n', (-zw(i)+zw(NumProfile)),-rw(i));
  end;

fprintf(u,';*********** Summary *****************\n');
  fprintf(u,'The total length of the secondary is: %f\n', -zChip);
  fprintf(u,'Top thickness is %f \n',abs(zShift));
  fprintf(u,'diameter of top is %f \n',2*abs(rw(NumProfile)));
  fprintf(u,'surface radius is %f \n',R);
  fprintf(u,'surface conic constant is %f \n',k);
  fprintf(u,'surfacecurvature is %f \n',c);

file('close',u);
end;

//****************************************************************
```

FIG. 21D

LIGHT CONCENTRATION APPARATUS, SYSTEMS AND METHODS

CROSS REFERENCE TO RELATED APPLICATIONS

This application is a continuation-in-part of U.S. application Ser. No. 12/846,729, filed Jul. 29, 2010, which claims the benefit under 35 U.S.C. §119(e) of U.S. Provisional Application No. 61/230,083, filed Jul. 30, 2009, and U.S. Provisional Application No. 61/230,485, filed Jul. 31, 2009. The entire contents of U.S. application Ser. No. 12/846,729 and U.S. Provisional Application Nos. 61/230,083 and 61/230,485 are incorporated herein by reference.

BACKGROUND

The present disclosure relates generally to optical devices, and more particularly to optical systems incorporating non-imaging optical components.

Solar cells for electrical energy production are very well known but have limited utility due to the very high cost of production. For example, although substantial research has been ongoing for many years, the cost per Kilowatt-hour (Kwh) still is about ten times that of conventional electric power production. To compete with wind power or other alternative energy sources, the efficiency of production of electricity from solar cells should be drastically improved.

Therefore it is desirable to provide optical systems and methods that overcome the above and other problems. In particular, it is desirable to provide systems and methods that enhance the efficiency of collection of solar energy.

SUMMARY

The present disclosure provides systems and methods to concentrate light from a distant source, such as the sun, onto a target device, such as a solar cell.

Aspects of the present disclosure are directed to optical devices and systems that provide high solar flux onto a multi-junction solar cell, or other target cell, to produce efficient electrical output.

According to one aspect, an optical device is provided that typically includes a primary focusing element, and a non-imaging secondary concentrator having an entry aperture and an exit aperture. Typically, the primary focusing element is configured to focus light from a distant source onto the entry aperture of the secondary concentrator. In certain aspects, the primary focusing element has an f-number that is greater than about 1, e.g., between 1 and 4 or greater. In certain aspects, the device includes a solar cell located proximal to the exit aperture of the secondary concentrator. In certain aspects, the primary focusing element includes a Fresnel lens. In certain embodiments, the Fresnel lens is flat, substantially square (or other shape lacking rotational symmetry about the optical axis of the device), curved and/or refractive.

In another aspect, an optical device is disclosed including: a non-imaging secondary concentrator having an entry aperture and an exit aperture, and configured to receive light focused by a primary focusing element from a source onto the entry aperture. The non-imaging secondary concentrator includes: a first portion proximal the entry aperture; and a second portion proximal to the exit aperture which is not rotationally symmetric about an optic axis. In a further aspect, the first portion proximal to the entry aperture is rotationally symmetric about an optic axis. The optical device further comprises a means for homogenizing the light focused onto the entry aperture of the secondary concentrator.

In another aspect, an optical device is disclosed, which comprises (1) a non-imaging secondary concentrator having an entry aperture and an exit aperture, and configured to receive light focused by a primary focusing element from a source onto the entry aperture, wherein the non-imaging secondary concentrator comprises: a first portion proximal the entry aperture; and a second portion proximal the exit aperture which is not rotationally symmetric about an optic axis, wherein the second portion comprises a truncated substantially square pyramidal portion, which extends and tapers along the optic axis from a wide end proximal the first portion to a narrow end comprising the exit aperture; and (2) a receiver located proximal to the exit aperture of the secondary concentrator, wherein the receiver is optically coupled to the exit aperture of the secondary concentrator, the shape of the exit aperture corresponds to the shape of the receiver, and the receiver is square shaped.

In another aspect, an optical device is disclosed, comprising (1) a non-imaging secondary concentrator having an entry aperture and an exit aperture, and configured to receive light focused by a primary focusing element from a source onto the entry aperture, wherein the non-imaging secondary concentrator comprises: a first portion proximal the entry aperture; and a second portion proximal the exit aperture which is not rotationally symmetric about an optic axis; (2) a receiver located proximal to the exit aperture of the secondary concentrator; and (3) wherein the optical device satisfies at least one of the following conditions:(a) the device further comprises the primary focusing element, the primary focusing element having an f-number that is greater than about 0.9; and (b) the secondary concentrator has an f-number of 1.0 or less.

In another aspect, an optical device is disclosed, including a non-imaging secondary concentrator having an entry aperture and an exit aperture, and configured to receive light focused by a primary focusing element from a source onto the entry aperture, wherein (1) the non-imaging secondary concentrator comprises: a first portion proximal the entry aperture; and a second portion proximal the exit aperture which is not rotationally symmetric about an optic axis; (2) the secondary concentrator includes a compound parabolic concentrator (CPC); (3) the first portion of the non-imaging secondary concentrator comprises a spherical or aspheric-shaped entrance aperture; and (4) the primary focusing element includes a Fresnel reflector.

In some embodiments, the first portion proximal the entry aperture is rotationally symmetric about an optics axis.

In some embodiments, the first portion proximal the entry aperture is squared off or trimmed. In some embodiments, the entry aperture of the non-imaging secondary concentrator is substantially square with rounded corners.

Thus, the first portion proximal the entry aperture may be rotationally symmetric or rotationally non-symmetric about an optics axis. Examples include shapes such as spherical, round, and elliptical, or multi-sided shapes such as triangle, square, pentagon, hexagon, etc., or other polygonal shape. Moreover, an apex where two edges of the first portion meet may be rounded, such as a square with rounded corners from a top view. Similarly, a rounded edge may be trimmed to have a straight portion, such as a circle trimmed to have one or more straight edges from a top view. For example, modification of an aperture by trimming may allow for lower cost manufacturing of secondary optical elements. Trimming or the like may provide higher yield of secondary optical elements, for example by allowing for more readily-available manufacturing tools, by speeding up a manufacturing process, by reducing breakage, or by closer packing of the apertures in a glass sheet. The terms squared off, trimmed, substantially squared, and rounded corners refer to alterations in a shape. Alterations may extend at any angle from the first portion towards the second portion of the concentrator, including but not limited to extending at an angle greater than 90 degrees for a distance along the side of the concentrator. It should be noted that the shape examples for the first portion allow for an aspheric implementation.

Some embodiments include a receiver located proximal to the exit aperture of the secondary concentrator. In some embodiments, the receiver is optically coupled to the exit aperture of the secondary concentrator.

In some embodiments, the second portion extends and tapers along the optic axis from a wide end proximal to the first portion to a narrow end including the exit aperture.

In some embodiments, the shape of the exit aperture corresponds to the shape of the receiver.

In some embodiments, the receiver is square shaped, and the second portion of the non-imaging secondary concentrator includes a truncated substantially square pyramidal portion extending which extends and tapers along the optic axis from a wide end proximal the first portion to a narrow end including the exit aperture.

In some embodiments, the non-imaging secondary concentrator is composed of a transparent dielectric material.

In some embodiments, the non-imaging secondary concentrator operates by total internal reflection.

In some embodiments, the non-imaging secondary concentrator operates by both total internal reflection and specular reflection.

In some embodiments, the secondary concentrator includes a compound parabolic concentrator (CPC).

In some embodiments, the first portion of the non-imaging secondary concentrator includes a spherical or aspheric-shaped entrance aperture.

In some embodiments, the secondary concentrator includes an angle transformer.

Some embodiments include the primary focusing element.

In some embodiments, the primary focusing element has an f-number that is greater than about 0.9, or greater than about 1.5.

In some embodiments, the primary focusing element includes a Fresnel lens. In some embodiments, the Fresnel lens is flat. In some embodiments, the Fresnel lens is substantially square. In some embodiments, the Fresnel lens is curved. In some embodiments, the Fresnel lens is refractive.

Some embodiments include a means for homogenizing the light focused onto the entry aperture of the secondary concentrator.

In some embodiments, the primary focusing element includes a diffractive lens, a reflector, or a Fresnel reflector.

In some embodiments, the receiver includes an energy converting element adapted to absorb light and output energy in response to the absorbed light.

In some embodiments, the energy converting element outputs electrical energy in response to the absorbed light.

In some embodiments, the energy converting element includes a photovoltaic cell, or a multi junction photovoltaic cell.

In some embodiments, the energy converting element produces thermal energy in response to the concentrated light.

In another aspect, a method is disclosed including: providing a non-imaging secondary concentrator having an entry aperture and an exit aperture; where the non-imaging secondary concentrator includes: a first portion proximal the entry aperture; a second portion proximal the exit aperture which is not rotationally symmetric about the optic axis. The method also includes receiving light focused by a primary focusing element from a source onto the entry aperture; concentrating light onto a receiver located proximal to the exit aperture of the secondary concentrator; and absorbing light concentrated on the receiver and outputting thermal or electrical energy in response to the absorbed light.

In another aspect, an apparatus is disclosed for concentrating light from a source including: a truncated tapered reflector extending along an optic axis from a wide end to a narrow end and defining an interior region; and a concentrating lens mounted in the wide end of the reflector, the lens having a central region disposed about the optic axis and a peripheral region disposed about the central region. The narrow end of the truncated tapered reflector is adapted to mount a receiver, and the concentrating lens is adapted to receive light from the source and concentrate light through the interior region and onto the receiver.

In some embodiments, a portion of the light from the source passing through the central region of the concentrating lens is directed to the receiver without reflecting from the reflector. A portion of the light from the source passing through the peripheral region of the concentrating lens is reflected from a surface of the reflector facing the interior region and onto the receiver.

In some embodiments, the concentrator lens includes a Fresnel lens.

In some embodiments, the truncated tapered reflector is a truncated substantially conical reflector having a round aperture at the wide end, and the concentrating lens is a round lens mounted in the round aperture.

In some embodiments, the truncated tapered reflector is a truncated substantially square pyramidal reflector having a square aperture at the wide end, and the concentrating lens is a square lens mounted in the square aperture.

Some embodiments include the receiver mounted at the narrow end of the reflector.

In some embodiments, the interior region includes a sealed volume. In some embodiments, the sealed volume includes an evacuated volume. In some embodiments, the sealed volume contains a refractive material.

In some embodiments, the refractive material includes a fluid. Some embodiments include a fluid exchange system in fluid communication with the sealed volume and configured to circulate the fluid through the volume. Some embodiments include a heat exchanger configured to extract heat from the circulating fluid.

In some embodiments, the concentrating lens is a comatic lens which is adapted to be substantially free from ray crossing at points about the optic axis proximal the narrow end of the reflector. In some embodiments, the concentrating lens is characterized in that, in the absence of the reflector, each pair light rays entering the lens parallel to the optic axis and at differing radial distances from the optic axis are directed without crossing to a plane extending transverse the optic axis at a position corresponding to the position of the receiver at the narrow end of the reflector.

In some embodiments, the concentrating lens has an f-number of 2 or less, of 1 or less, of 0.75 or less, or of 0.5 or less.

In some embodiments, light from the source incident on the concentrating lens at an angle of incidence less than about 1.5 degrees from the optic axis is concentrated to the receiver with an efficiency of greater than about 70%, 80%, 85%, or more.

In some embodiments, light from the source incident on the front surface at an angle of incidence less than about 2 degrees is concentrated to the receiver with a geometrical concentration ratio of about 500 or greater, about 600 or greater, about 800 or greater, or more.

Some embodiments include the source. In some embodiments, the source includes a light emitting diode; an organic light emitting diode, a laser; and a lamp.

In some embodiments, the receiver includes an energy converting element adapted to absorb light and output energy in response to the absorbed light.

In some embodiments, the energy converting element outputs electrical energy in response to the absorbed light. In some embodiments, the energy converting element includes a photovoltaic cell. In some embodiments, the energy converting element includes a multi-junction photovoltaic cell.

In some embodiments, the energy converting element produces thermal energy in response to the concentrated light.

In some embodiments, the receiver includes a photodiode, a laser gain medium, or a photographic medium.

In some embodiments, the receiver includes a digital imaging sensor. In some embodiments, the digital imaging sensor included is of at least one element selected from the group consisting of: a CCD, a multi-pixel array of photodetectors, and a CMOS detector.

In some embodiments, the receiver includes a digital light processor or a MEMs device.

In some embodiments, the receiver includes a light emitting element, and where the reflector and the concentrating lens cooperate to collect emitted light from the light emitting element and form a beam of emitted light which is output from the wide end of the reflector. In some embodiments, the beam is substantially collimated.

In some embodiments, the light emitting element includes a light emitting diode, an organic light emitting diode, a laser, or a lamp.

In some embodiments, the source is the sun.

In another aspect, a method is disclosed including: providing a concentrator which includes a truncated tapered reflector extending along an optic axis from a wide end to a narrow end and defining an interior region; a concentrating lens mounted in the wide end of the reflector, the lens having a central region disposed about the optic axis and a peripheral region disposed about the central region; and a receiver mounted in the narrow end of the reflector. The method also includes using the concentrating lens to receive light from the source and concentrate light through the interior region and onto the receiver.

In some embodiments, using the concentrating lens to receive light from the source and concentrate light through the interior region and onto the receiver includes: passing a first portion of the light from the source through the central region of the concentrating lens to direct the first portion to the receiver without reflecting from the reflector; passing a second portion of the light from the source through the peripheral region of the concentrating lens to direct the second portion to the reflector; and reflecting the second portion from a surface of the reflector facing the interior region and onto the receiver.

In some embodiments, the concentrator lens includes a Fresnel lens.

In some embodiments, the truncated tapered reflector is a truncated conical reflector having a round aperture at the wide end, and the concentrating lens is a round lens mounted in the round aperture.

In some embodiments, the truncated tapered reflector is a truncated square pyramidal reflector having a square aperture at the wide end, and where the concentrating lens is a square lens mounted in the square aperture.

In another aspect, an apparatus is disclosed for concentrating light from a source which includes a truncated trough shaped reflector. The reflector extends along a longitudinal axis, and extends and tapers along a latitudinal axis from a wide end to a narrow end. The trough defines an interior region divided by an optic plane extending along the longitudinal and latitudinal axes. Also included are a concentrating lens mounted in the wide end of the reflector extending along the longitudinal axis and transverse the optic plane, the lens having an inner region proximal the optic plane and one or more outer regions distal the optic plane. The narrow end of the conical reflector is adapted to mount a receiver; and the concentrating lens is adapted to receive light from the source and concentrate light through the interior region and onto the receiver.

In some embodiments, a portion of the light from the source passing through the inner region of the concentrating lens is directed to the receiver without reflecting from the reflector; and a portion of the light from the source passing through the one or more outer regions of the concentrating lens is reflected from a surface of the reflector facing the interior region and onto the receiver.

In some embodiments, the concentrator lens includes a Fresnel lens.

In some embodiments, light from the source incident on the concentrating lens at an angle of incidence within at least about 1 degree from normal to the lens in a direction transverse the optic plane and within at least about 20 degrees from normal to the lens in the longitudinal direction is concentrated to the concentration region with an efficiency of greater than about 85%.

In some embodiments, light from the source incident on the concentrating lens at an angle of incidence within at least about 1 degree from normal to the lens in a direction transverse the optic plane and within at least about 20 degrees from normal to the lens in the longitudinal direction is concentrated on the receiver with a geometrical concentration ratio of about 10 or greater.

In another aspect, an apparatus for concentrating light from a source is disclosed including: a truncated tapered reflector extending along an optic axis from a wide end to a narrow end and defining an interior region; and a concentrating lens mounted in the wide end of the reflector. The narrow end of the conical reflector is adapted to mount a receiver. The concentrating lens is adapted to receive light from the source and concentrate light through the interior region and onto the receiver. A first portion of the light from the source passing through the concentrating lens is directed to the receiver without reflecting from the reflector. A second portion of the light from the source passing through the concentrating lens is reflected from a surface of the reflector facing the interior region and onto the receiver.

In another aspect, an apparatus for concentrating light from a source is disclosed including: a truncated trough shaped reflector which extends along a longitudinal axis and extends and tapers along a latitudinal axis from a wide end to a narrow end. The trough defines an interior region divided by an optic plane extending along the longitudinal and latitudinal axes. A concentrating lens mounted in the wide end of the reflector extends along the longitudinal axis and traverses the optic plane. The narrow end of the conical reflector is adapted to mount a receiver. The concentrating lens is adapted to receive light from the source and concentrate light through the interior region and onto the receiver. A first portion of the light from the source passing through the concentrating lens is directed to the receiver without reflecting from the reflector. A second portion of the light from the source passing through concentrating lens is reflected from a surface of the reflector facing the interior region and onto the receiver.

Various embodiments may include any of the above described features, either alone, or in combination.

As used herein, the f-number of an optical element is defined as one half times the inverse of the numerical aperture NA of the element. For an optical element having an acceptance angle θ, and working in a media having an index of refraction n, the numerical aperture is given by NA=n sin θ.

BRIEF DESCRIPTION OF THE DRAWINGS

FIG. 11a-11c illustrate a three dimensional concentrator with a circular concentrating lens. FIG. 11a is a perspective view. FIG. 11b is a ray trace illustration. FIG. 11c is a cross section.

FIGS. 14a-14c illustrate a three dimensional concentrator with a square concentrating lens.

FIG. 15 is a chart of characteristics of the concentrator of FIGS. 11a-11c and the concentrator of FIGS. 14a-14c.

FIG. 18a is a perspective view, FIG. 18b is a cross section.

FIG. 19 is a chart of characteristics of the concentrator of FIGS. 18a-18b.

FIG. 20 shows plots of the optical efficiency vs angle of incidence for the concentrator of FIGS. 18a-18b.

FIGS. 21a-21d show a listing of a SciLab script of an exemplary optical design method.

DETAILED DESCRIPTION

Figure 1:
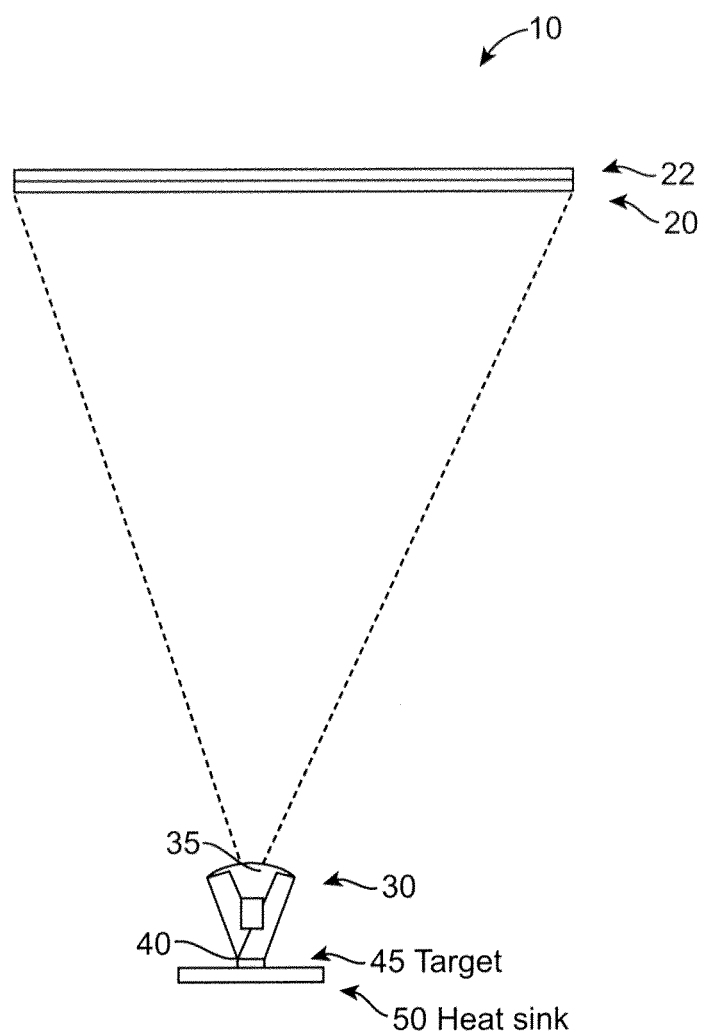
FIG. 1 illustrates an optical device.

The present disclosure provides systems and methods to concentrate light from a distant source, such as the sun, onto a target device, such as a solar cell.

According to one embodiment, an optical device 10 includes a primary focusing element 20, and a non-imaging secondary concentrator 30 having an entry aperture 35 and an exit aperture 40. In one aspect, the primary focusing element 20 is configured to focus light from a distant source onto the entry aperture 35 of the secondary concentrator 30. Light received at the entry aperture 35 is provided to an exit aperture 40. In one aspect, a target device 45 such as a solar cell is located proximal to the exit aperture 40 to receive the concentrated light. The target device 45 may be located above or below a plane defining the exit aperture or it may be located substantially on the plane, or it may be optically coupled with the exit aperture.

In certain aspects, the primary focusing element 20 includes a lens element that has an f-number that is greater than about 1, e.g., between 1 and 4 or even greater. One example of a useful primary focusing element 20 is a substantially flat and square Fresnel lens. Other useful primary focusing elements include curved Fresnel lenses, non-square, flat Fresnel lenses, a Fresnel reflector, any focusing lens, a diffractive lens, a reflective element such as a mirror, a holographic lens element, or any other optical element that focuses or redirects light. In one aspect, a flat cover 22, e.g., made of glass or PMMA or other suitable optically transparent material, is positioned on or proximal to the primary focusing element on a side opposite the non-imaging secondary concentrator. Cover 22 provides additional environmental protection for the primary focusing element 20 or any other optical element, and allows the primary focusing element 20 to be very thin, e.g., a very thin layer.

In certain aspects, the device 10 also includes a means for homogenizing the light focused onto the entry aperture of the secondary concentrator. Examples of homogenizing elements or systems include Kohler homogenizers, holographic devices, kaleidoscopes, etc. U.S. patent application Ser. No. 11/683,934, filed Mar. 8, 2007, illustrates useful homogenizing elements and is incorporated herein by reference in its entirety. Also, U.S. patent application Ser. No. 11/084,882, filed Mar. 21, 2005, illustrates useful concentrator elements and other optical device features and is incorporated herein by reference in its entirety.

In certain aspects, the non-imaging secondary concentrator 30 is composed of a transparent dielectric material. In certain aspects, the non-imaging secondary concentrator 30 includes a compound parabolic concentrator (CPC), or a θi/θo angle transformer, or a flow line concentrator. For example, the secondary concentrator 30 may be made of a transparent dielectric material and may include a spherical or aspheric-shaped entrance aperture and a planar exit aperture. It should be appreciated that any concentrator element can be used. For example, the non-imaging secondary concentrator, in certain aspects, may operate by total internal reflection (TIR) and/or specular reflection. The region between the primary focusing element 20 and the concentrator 30 may be composed of air (n=1) or a solid transparent dielectric material having a different index of refraction than the concentrator, e.g., between 1 and 3, or greater. A liquid medium having a different index of refraction than the concentrator may also be used, in which case a body structure is included to hold the primary focusing element, the concentrator and the liquid medium.

In certain aspects, the device advantageously has an optical acceptance angle of about 5 degrees or greater with an optical efficiency of between about 80-85%. In certain aspects, the devices of the present invention provide a uniform flux distribution on the target (e.g., solar cell) and are suitable for use with multi junction (MJ) and Si target cells, among others. In one specific embodiment, for example, a device might be configured with a 125 mm×125 mm entry aperture and a depth of about 230 mm. Solar cell sizes for this embodiment might include a 5.5 mm×5.5 mm MJ cell or a 10 mm×10 mm Si cell. This would provide a geometric concentration of about 500 for the MJ cell or about 150 for the Si cell, with acceptance angles of about 30 degrees for the MJ cell or 5 degrees for the Si cell, and an optical efficiency of between about 80-85%.

It should be appreciated that target 45 may include a light source or an illumination element, in which case the optical system operates as an illuminator.

According to one embodiment, a heat sink 50 is provided on which one or more optical systems can be mounted. The heat sink may include a U-beam structure or comb structure as is well known. However, other structures may be used as desired. The heat sink may also provide a platform on which multiple systems can be mounted. The target cell may be attached directly to the heat sink, or a heat spreader (e.g., Aluminum Nitride) may be provided to couple the heat sink with the target and enhance heat dissipation from the cell to the heat sink. In certain aspects, a tracking system is provided to reposition the system(s) as needed to track the motion of the sun and maintain the light impinging on the system within a desirable acceptance angle.

Figure 2B:
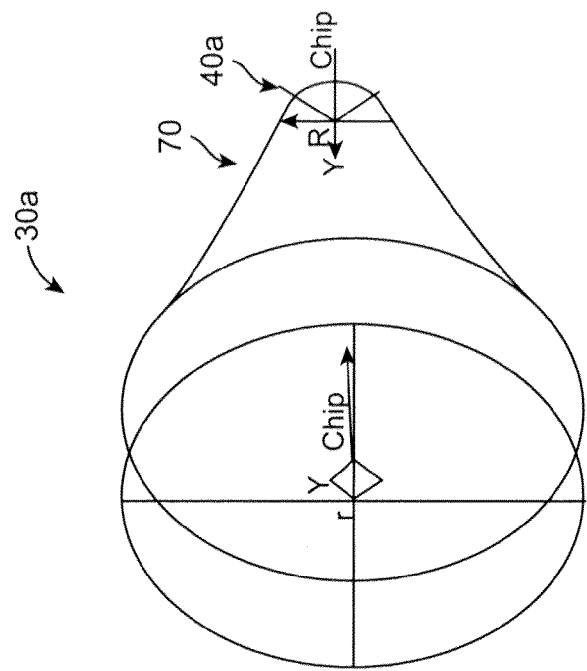
FIG. 2b is a perspective view of a rotationally symmetric secondary concentrator.
Figure 2A:
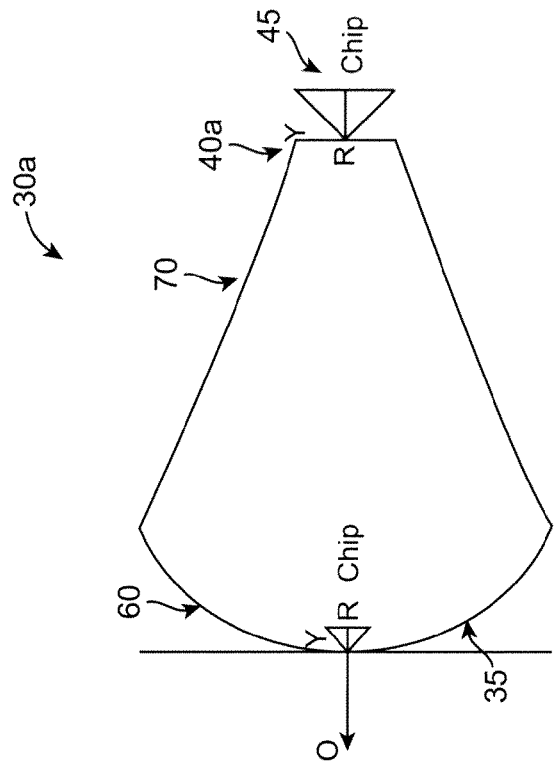
FIG. 2a is a side view of a rotationally symmetric secondary concentrator.

FIGS. 2a and 2b show one embodiment 30a of concentrator 30 which includes a spherical top portion 60 which includes entrance aperture 35. Concentrator 30a also includes a bottom conical tapering portion 70 which includes circular exit aperture 40 for concentrating light onto the target cell 45. Both portions of concentrator 30a are rotationally symmetric about optic axis O.

Figure 2C:
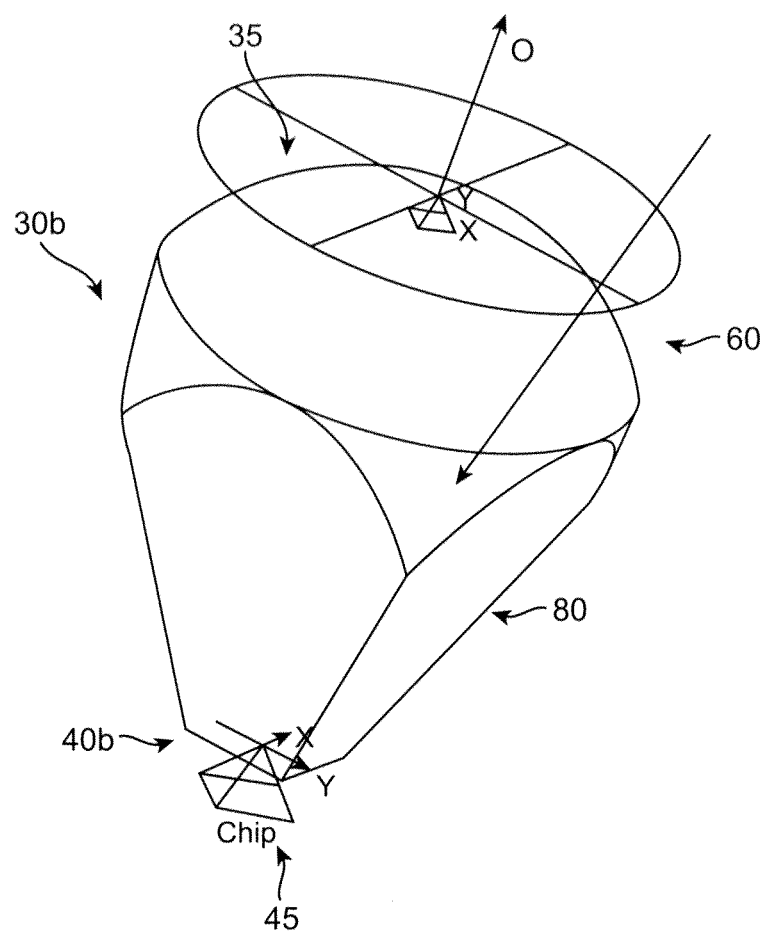
FIG. 2c is a perspective view of a secondary concentrator featuring a rotationally asymmetric portion.

FIG. 2c shows an alternate embodiment 30b of concentrator 30 which includes a spherical top portion 60 which includes entrance aperture 35. This top portion is similar to the top portion of concentrator 30a. However, concentrator 30b includes a bottom tapering portion 80 which includes square exit aperture 40b for concentrating light onto the target cell 45. Thus concentrator 30b includes a top portion 60 which is rotationally symmetric about optic axis O, and a bottom portion 80 which in not rotationally symmetric.

Figure 2D:
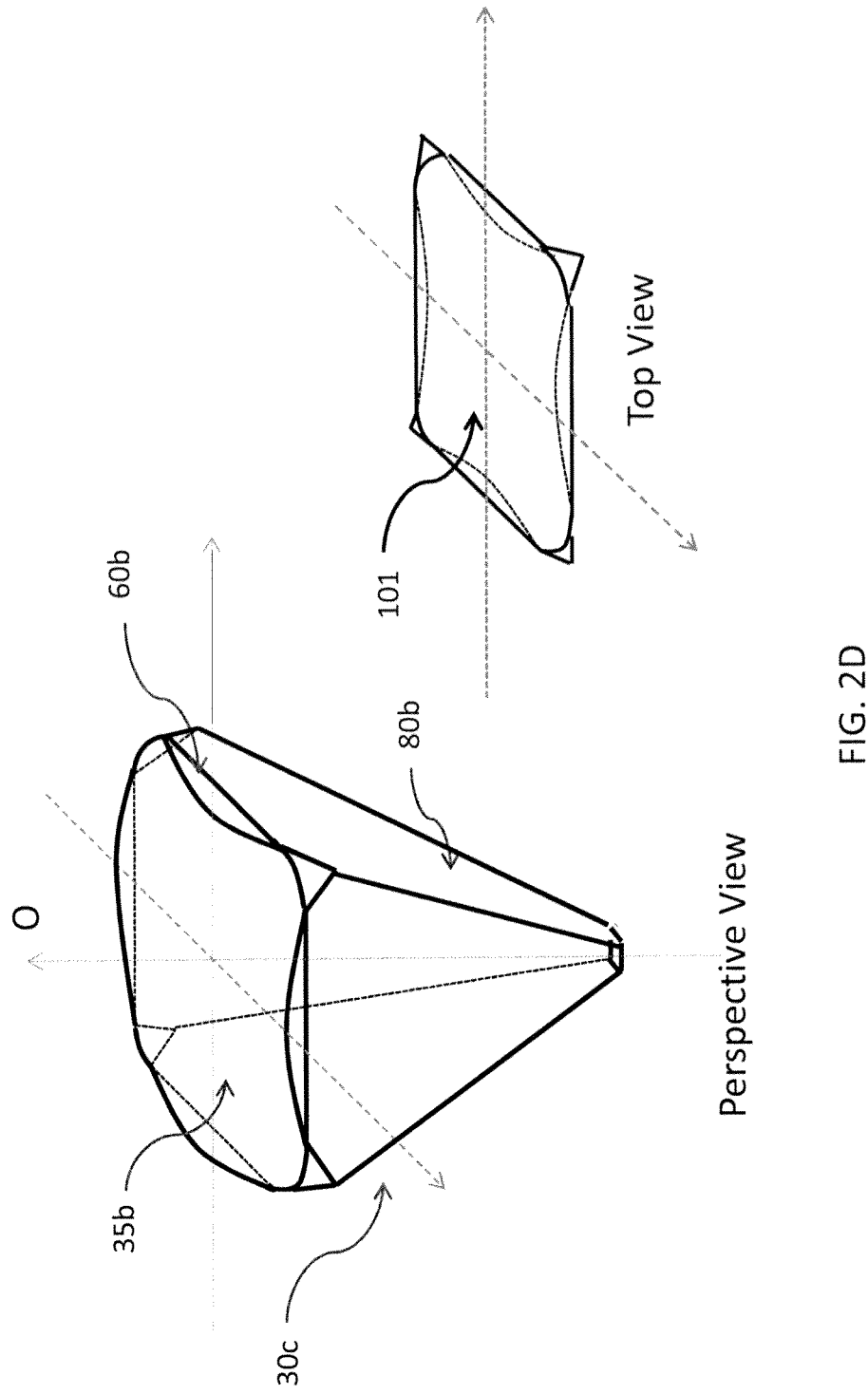
FIG. 2d illustrates a secondary concentrator having a rotationally asymmetric first portion and a rotationally asymmetric second portion.

FIG. 2d shows another embodiment 30c of the concentrator 30 which includes a spherical top portion 60b having an entrance aperture 35b and a bottom tapering portion 80b similar to the bottom tapering portion 80. The spherical top portion 60b is truncated at four sides such that the entrance aperture 35b is substantially square with rounded corners as shown from a top view. In some embodiments, the spherical top portion 60b is truncated such that the four side surfaces are parallel to the optic axis O. In some embodiments, the spherical top portion 60b is truncated such that the four side surfaces are the extension of the surface of bottom tapering portion 80b. In some embodiments, the spherical top portion 60b is truncated such that the four side surfaces tilt upwards towards the optic axis O.

Figure 2E:
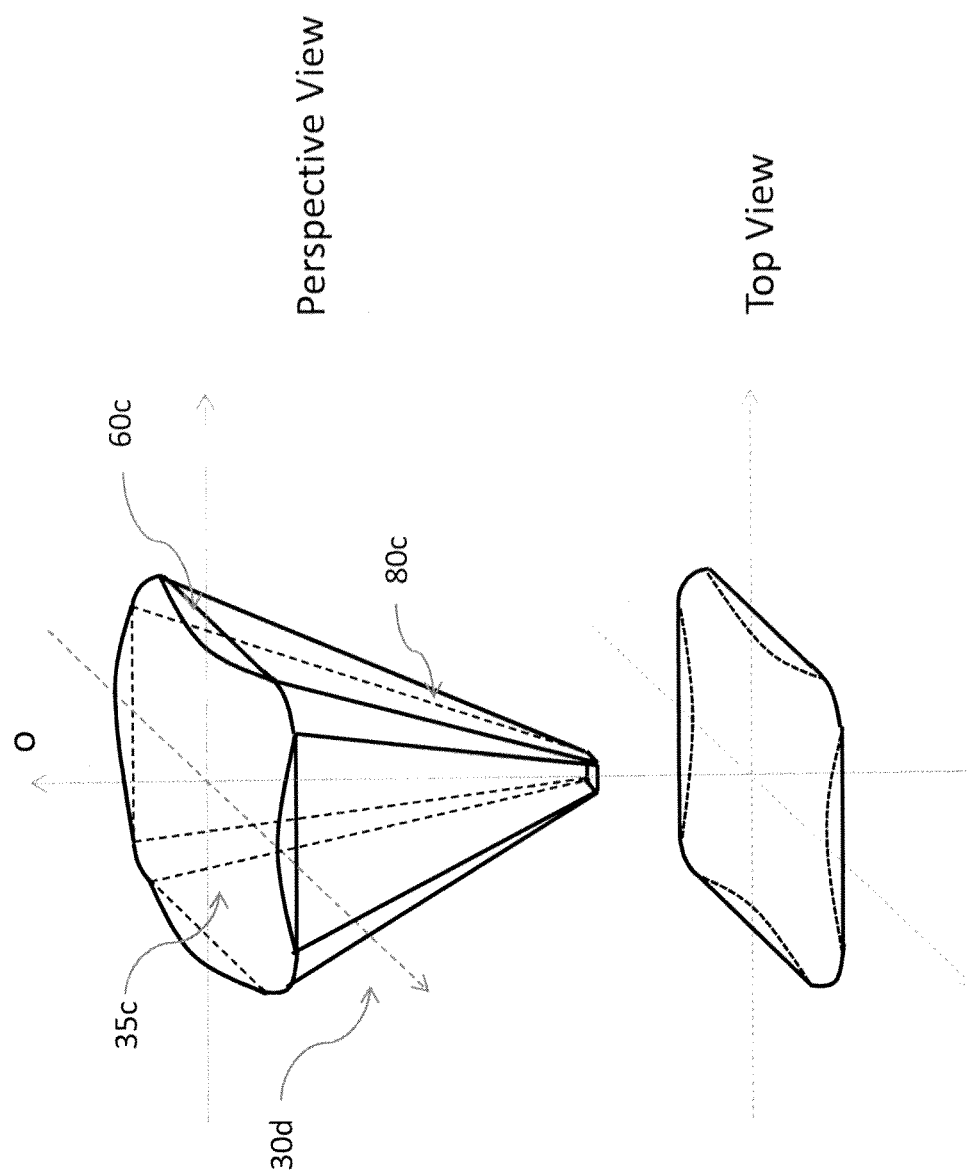
FIG. 2e illustrates a secondary concentrator having a rotationally asymmetric first portion and a rotationally asymmetric second portion with rounded arrises.

FIG. 2e shows another embodiment 30d of the concentrator 30 which includes a spherical top portion 60c having an entrance aperture 35c and a bottom tapering portion 80c. The spherical top portion 60c is similarly truncated as the spherical top portion 60b such that the entry aperture 35c is substantially square with rounded corners. The bottom tapering portion 80c is similar to the bottom tapering portion 80 except that the four arrises of the bottom tapering portion 80c are rounded.

It should be appreciated that, in some embodiments, the top portion 60 of concentrator 30 may be aspheric and may be truncated in the same way as spherical top portions 60b and 60c.

Note that, in other embodiments, bottom portion 80 may terminate in exit apertures having other shapes, e.g. a triangle, a regular polygon, an irregular shape, etc.

Figure 3:
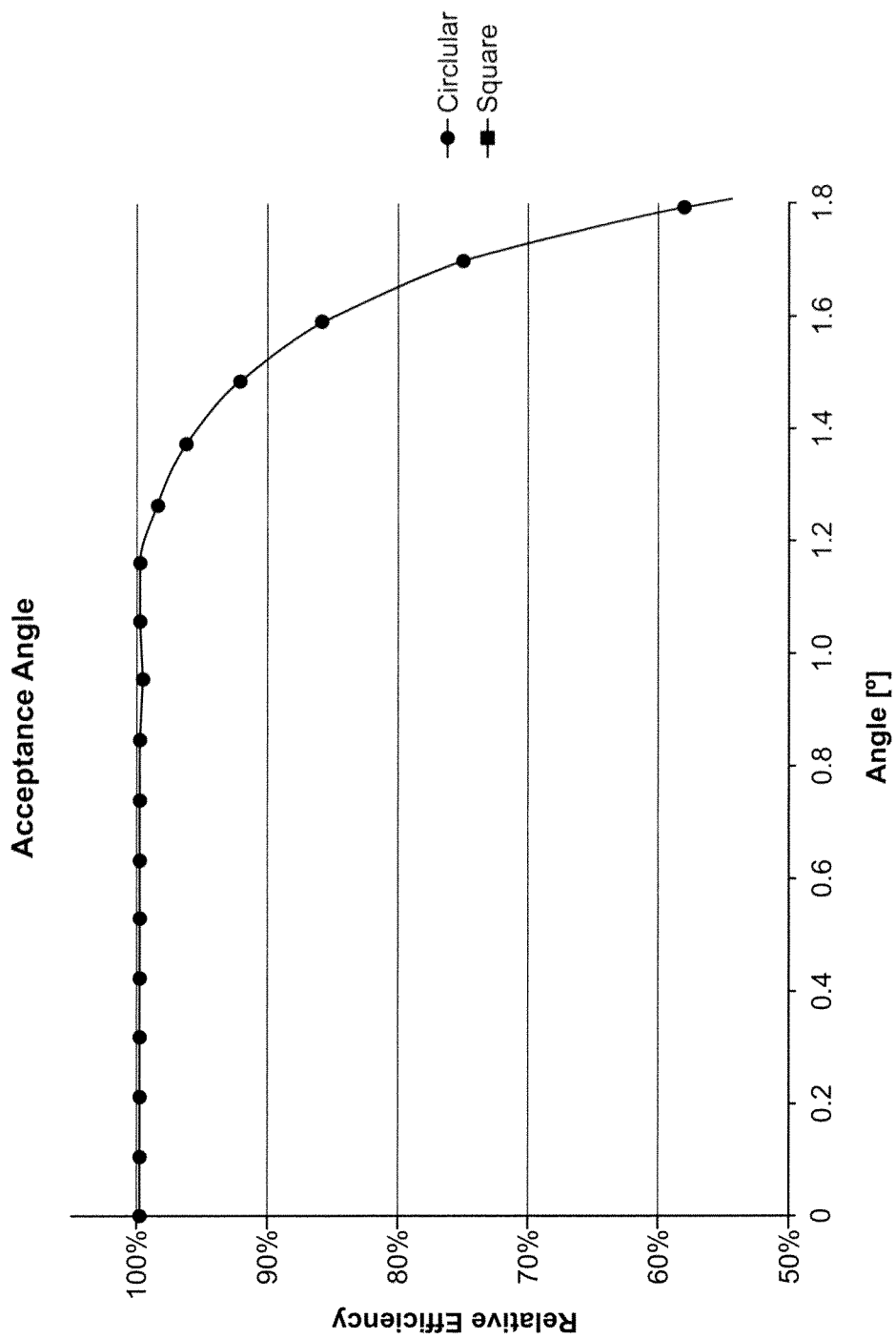
FIG. 3 is a plot of optical efficiency vs. angle of incidence for two types of secondary concentrators.

FIG. 3 shows a plot of optical efficiency vs acceptance angle for concentrator 30a with a circular exit aperture and concentrator 30b with a square exit aperture. The results are substantially identical for both concentrators 30a and 30b. However, the distribution of irradiance at target cell 45 differs between the concentrators 30a and 30b.

Figure 4A:
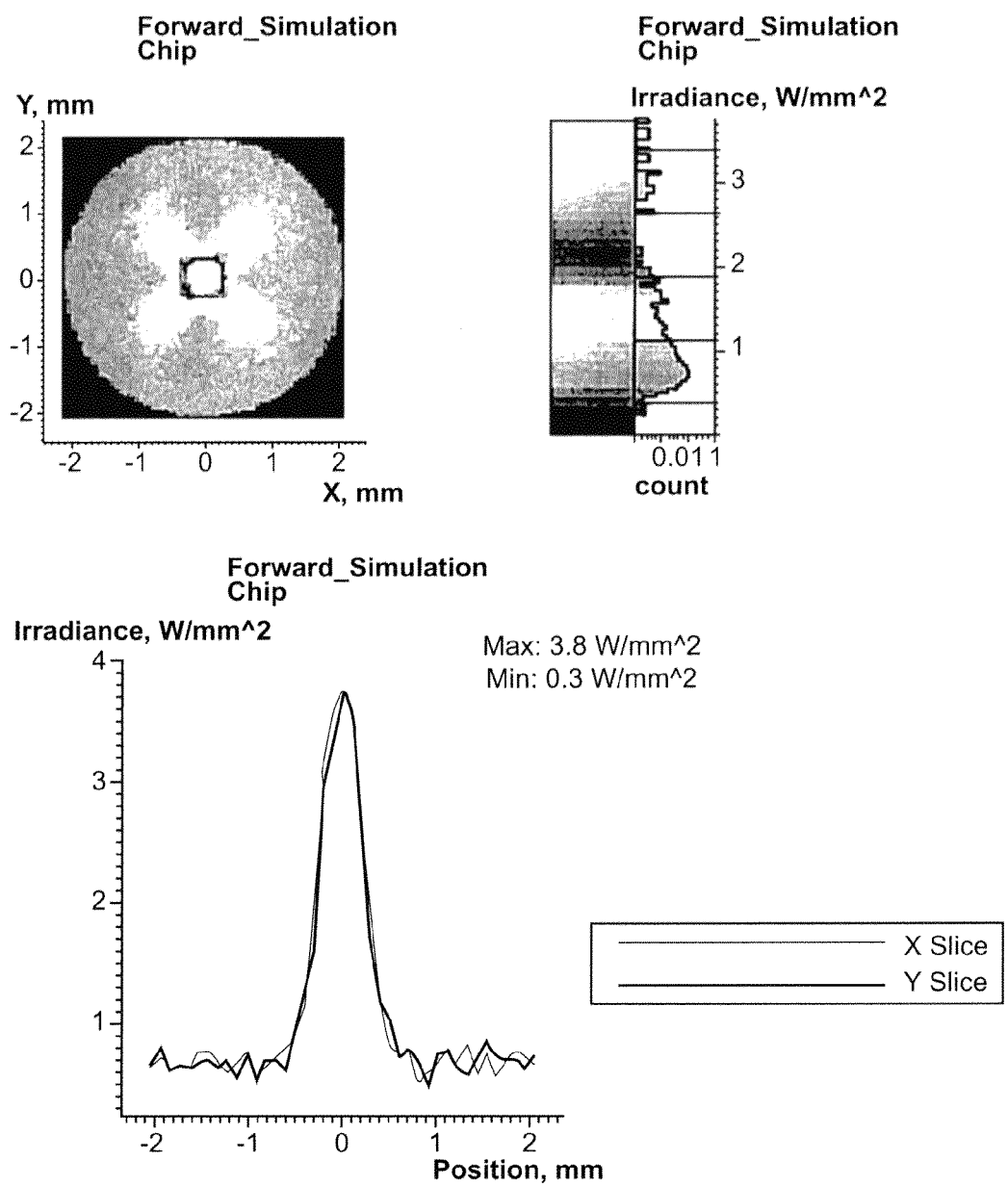
FIGS. 4a-4c are irradiance plots for a target illuminated by rotationally symmetric secondary concentrator.
Figure 4B:
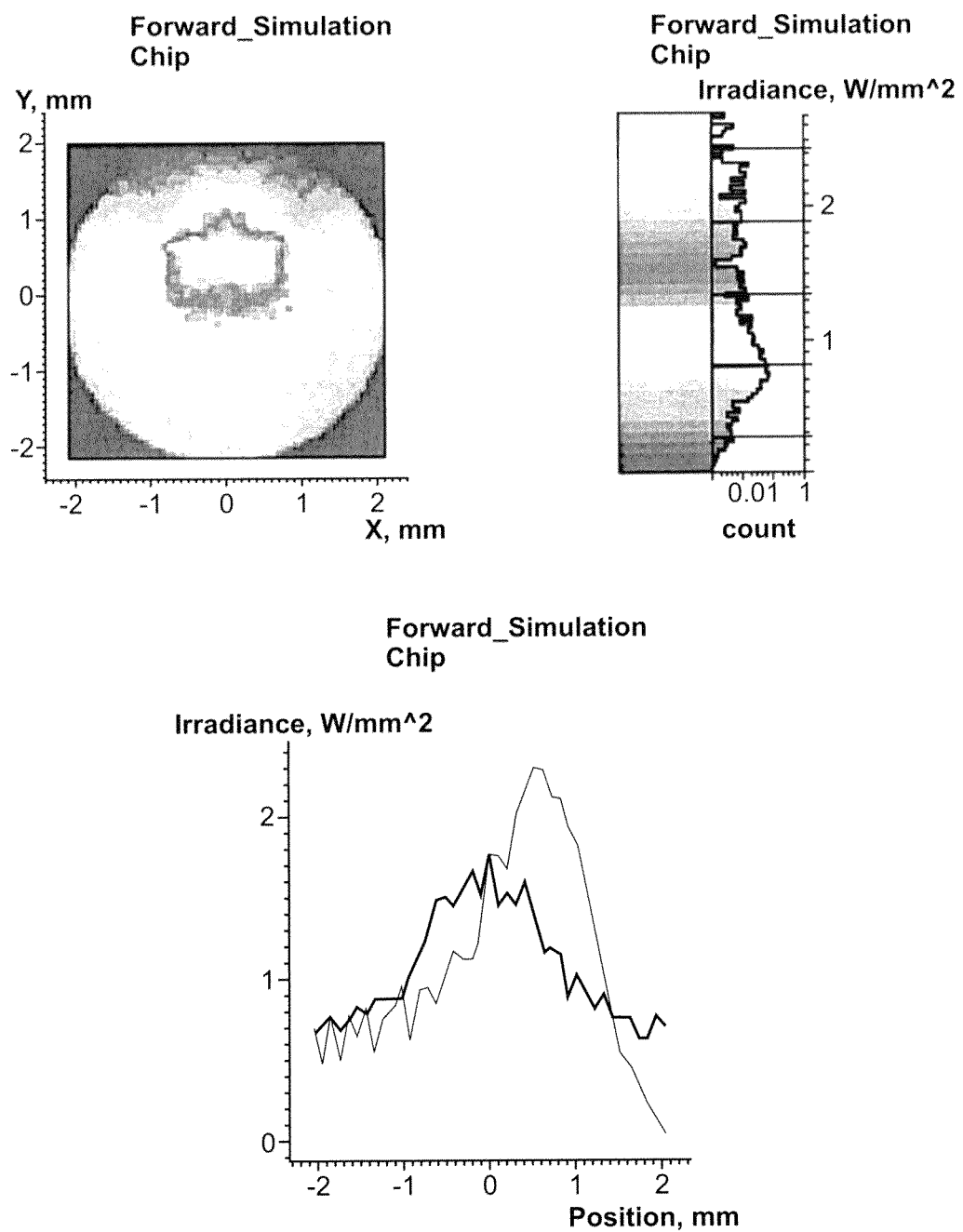
Figure 4C:
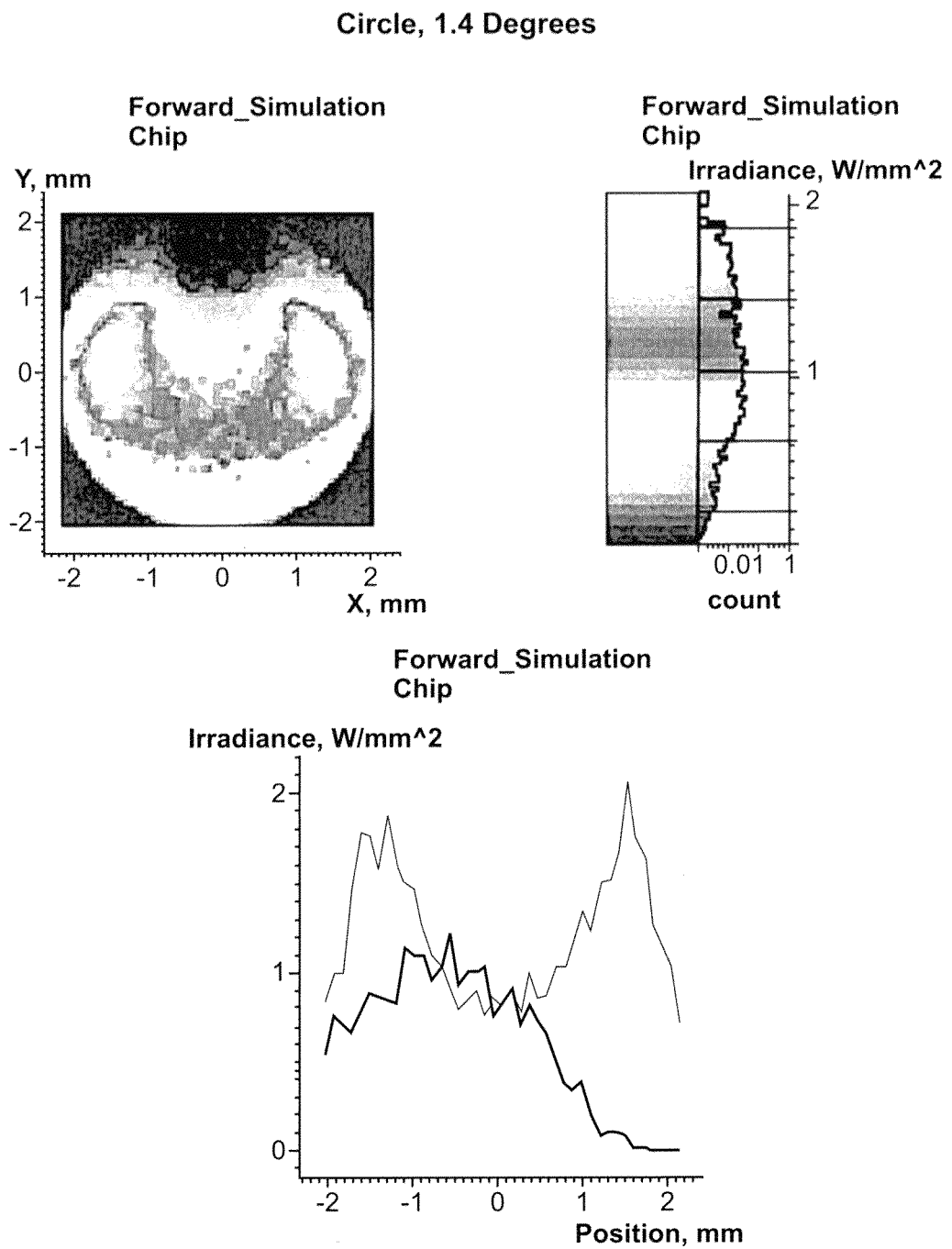

For example, FIGS. 4a-4c show plots of the irradiance of target cell 45 using concentrator 30a for light incident at 0 degrees, 0.8 degrees and 1.4 degrees, respectively. Note that in FIGS. 4a and 4b, the irradiance is strongest at the center of the target.

Figure 5A:
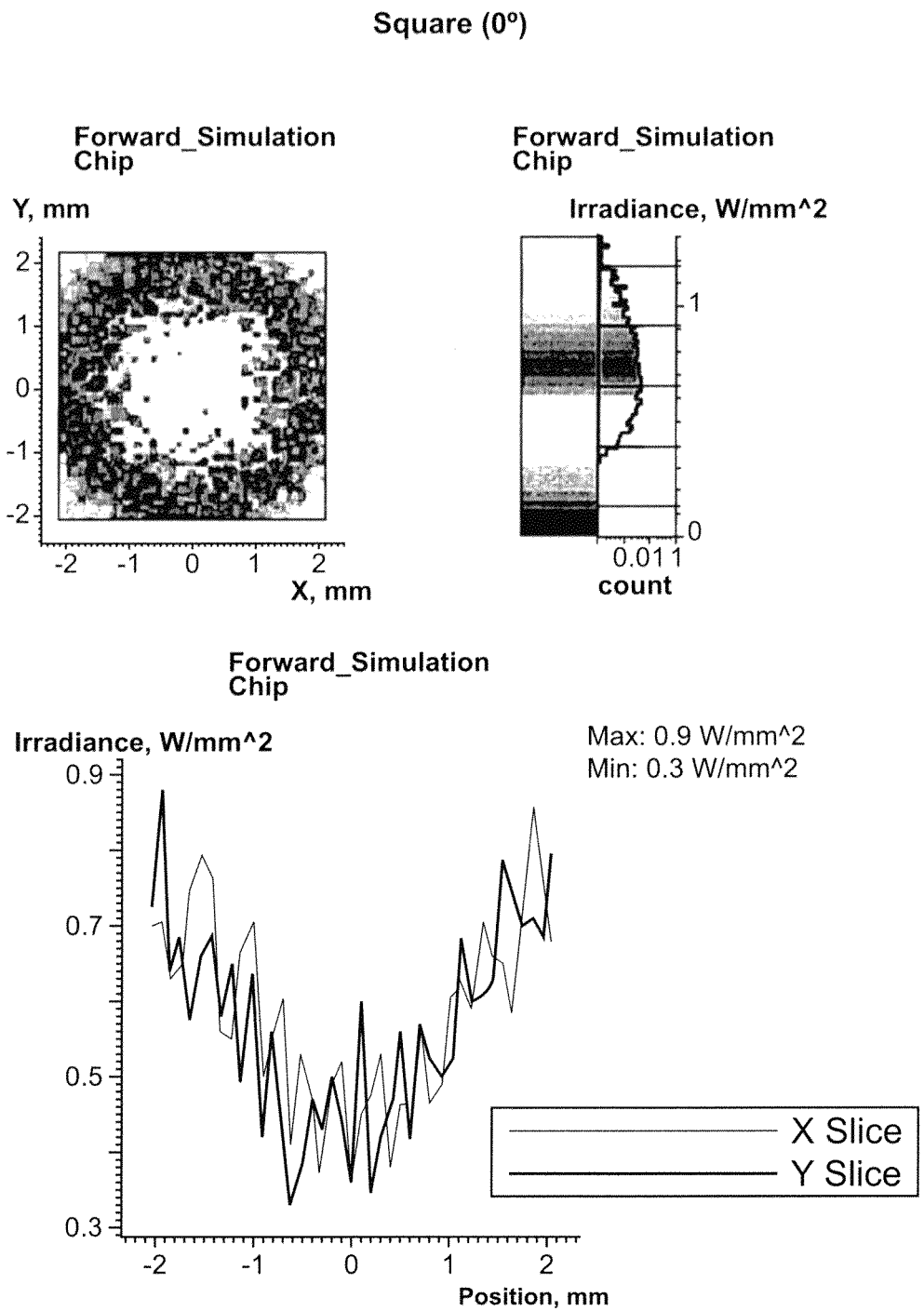
FIGS. 5a-5d are irradiance plots for a target illuminated by a secondary concentrator featuring a rotationally asymmetric portion.
Figure 5B:
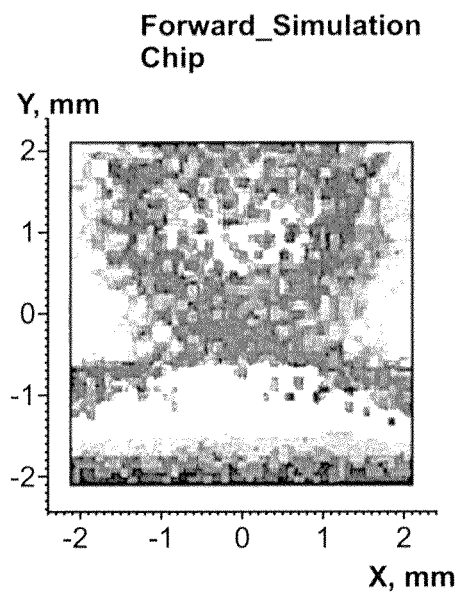
Figure 5B:
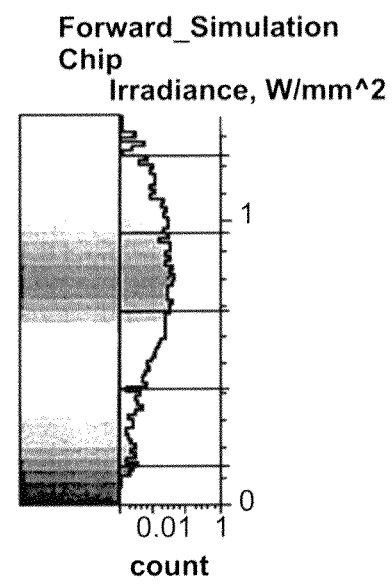
Figure 5B:
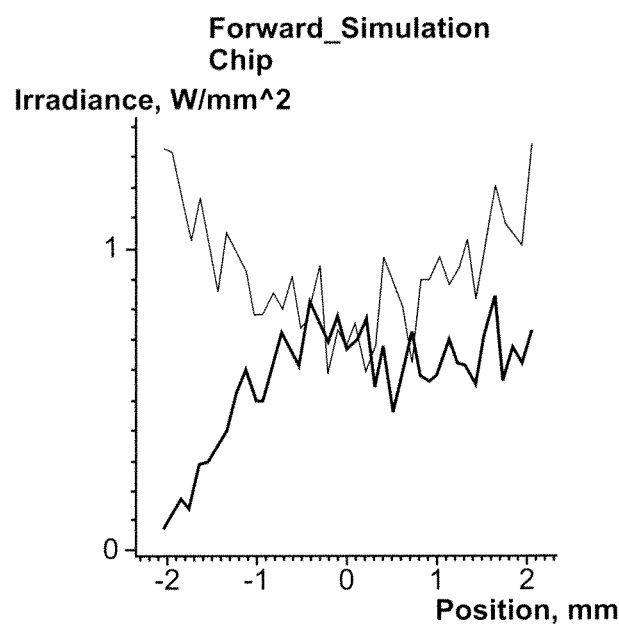
Figure 5C:
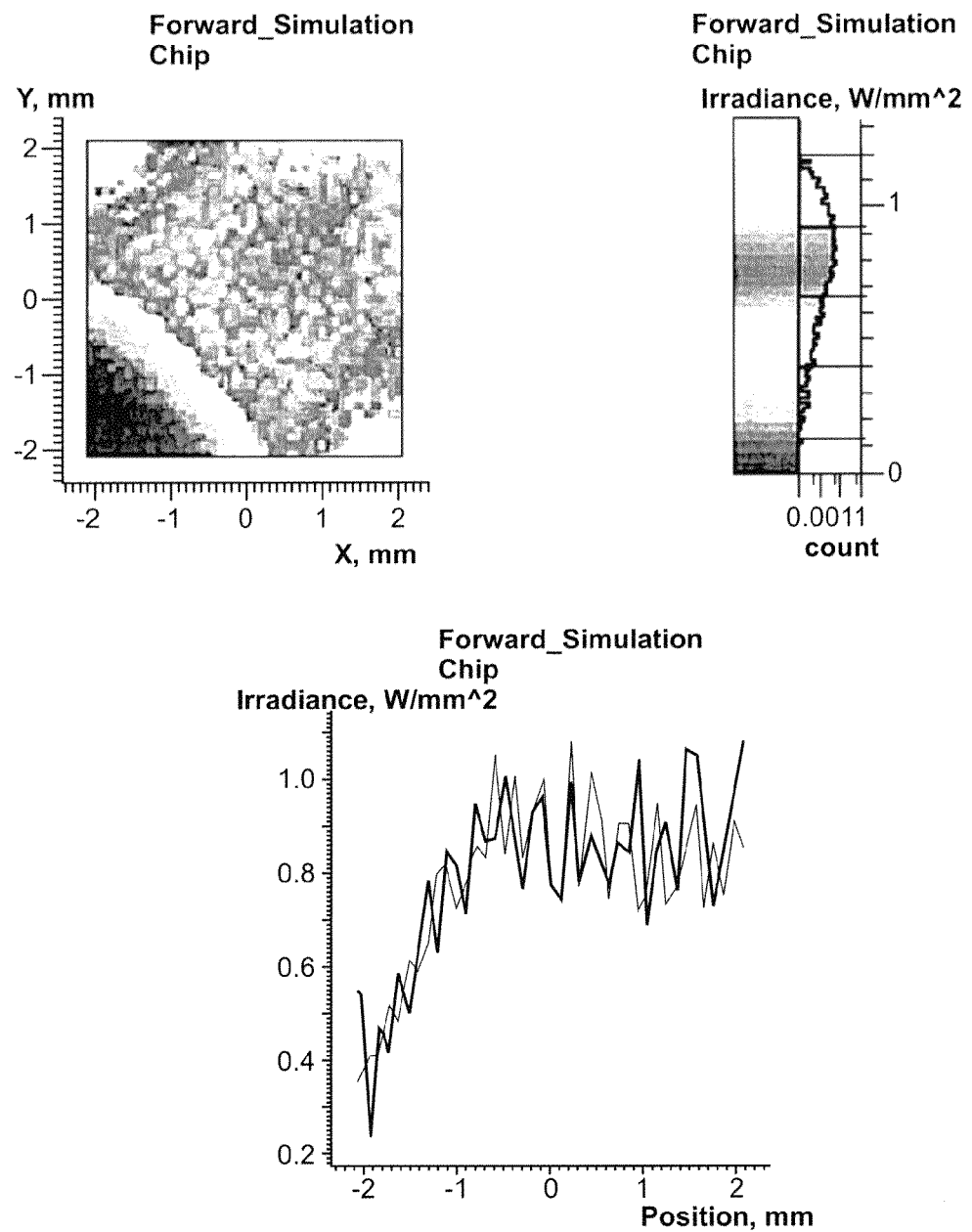
Figure 5D:
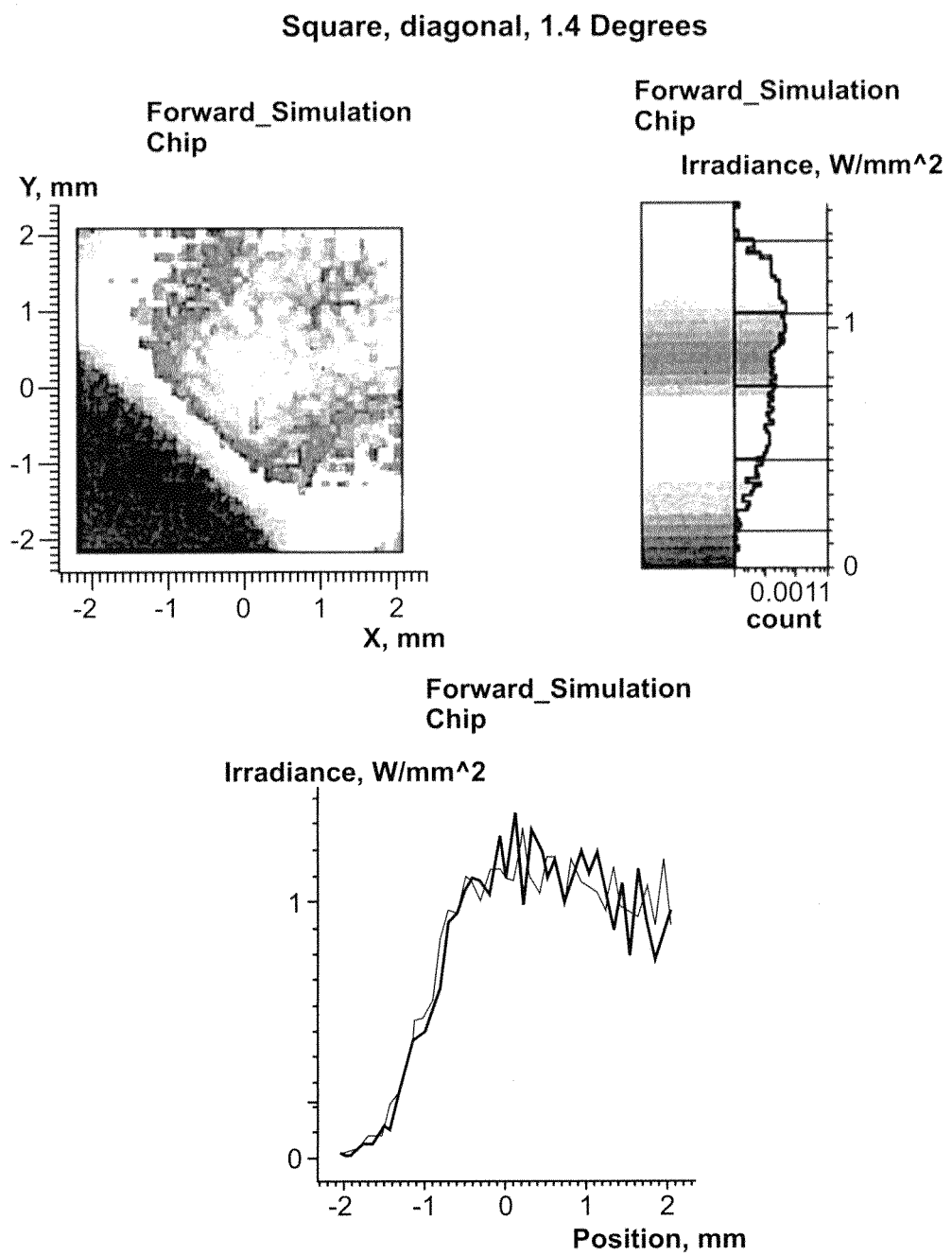

FIGS. 5a-d show plots of the irradiance of target cell 45 using concentrator 30b for light incident at 0 degrees, 0.8 degrees, 0.8 degrees and 1.4 degrees, respectively. In FIG. 5b, the angle is in a direction parallel to a side of the square exit aperture. In FIGS. 5c and 5d, the angle is in a direction parallel to the diagonal of the square aperture. Note that, for concentrator 30b, the irradiance of target cell 45 is less peaked at the center of the cell. For example, in some embodiments, the ratio of the peak concentration on the cell to the average concentration over the cell may be 5.0 or less, 4.0 or less, 3.0 or less, 2.0 or less, or even about 1.0 (corresponding to uniform illumination.)

Thus, concentrator 30b may be used advantageously in application where it is beneficial to "spread out" the irradiance more uniformly across target cell 45. As is known in the art, many types of solar cells and other optical devices operate more efficiently when uniformly illuminated. For example, a typical solar cell may be suitable for use at concentrations of, e.g. up to C=500. However, in some applications even though the average concentration on the cell is below this limit, when such a device is illuminated non-uniformly, e.g., such that solar light is concentrated to localized portions of the cell at concentrations significantly greater than C=500. This uneven concentration can lead to localized regions of high temperature on the cell, leading to degraded performance and possible damage. In addition, ultra-high solar flux can cause electric breakdown of tunnel diode layers between junctions of a multi-junction cell and performance degradation.

Notably, concentrator 30b may provide the advantageous uniform distributions described above with a relatively simple shape and compact form factor. For example, in some embodiments, concentrator 30b has a shape suitable for fabrications using molding techniques known in the art. For example, the concentrator may be fabricated by flowing molten glass into a form and allowing the glass to cool and solidify. In some embodiments (e.g., for relatively low temperature concentration applications), the concentrator can be molded from acrylic, plastic, or other suitable material. In some embodiments the concentrator may be relatively short, e.g. characterized by an f-number of 2 or less, 1 or less, 0.5 or less, etc.

A person skilled in the art will appreciate that these features represent advantages over conventional optical mixers. Such mixers are typically refractive elements which are rotationally asymmetric about an optical axis. These devices receive light at an entrance face, mix incoming light using a multiple successive TIR (total internal reflection) reflections from lateral surfaces of the mixer, and output light with a more uniform distribution from an exit face. Typically, these mixers have complicated shapes which cannot be fabricated using molding techniques, requiring instead more complicated and costly fabrication techniques such as precision grinding. Moreover, these mixers are typically very long, and cannot be used in high concentration systems (e.g., systems which provide concentration at or near the thermodynamic limit) while maintaining a small f-number (e.g. less than 0.5, less than 1.0, less than 2.0, etc.). Further, because the reliance on multiple TIR reflections, mixers of this type are often susceptible to performance degradation due to debris on or damage to the mixer's lateral surface.

Concentrator 30b may include any of the features described above. Various embodiments of concentrator 30b can be designed and tailored for a given application using techniques known in the art. For example, FIGS. 21a-d contain an exemplary script for generating the design of a concentrator of the type described above in the well-known SciLab scientific computing environment (available at "http://www.scilab.org").

Lens-Mirror Concentrator

In another aspect of this disclosure, embodiments of concentrators featuring a lens (e.g. fast lenses having a low f-number, e.g. lower than 2, lower than 1, lower than 0.9, lower than 0.75, or lower than 0.5 or less) paired with a reflective mirror surface to concentrate light onto a receiver.

Figure 6:
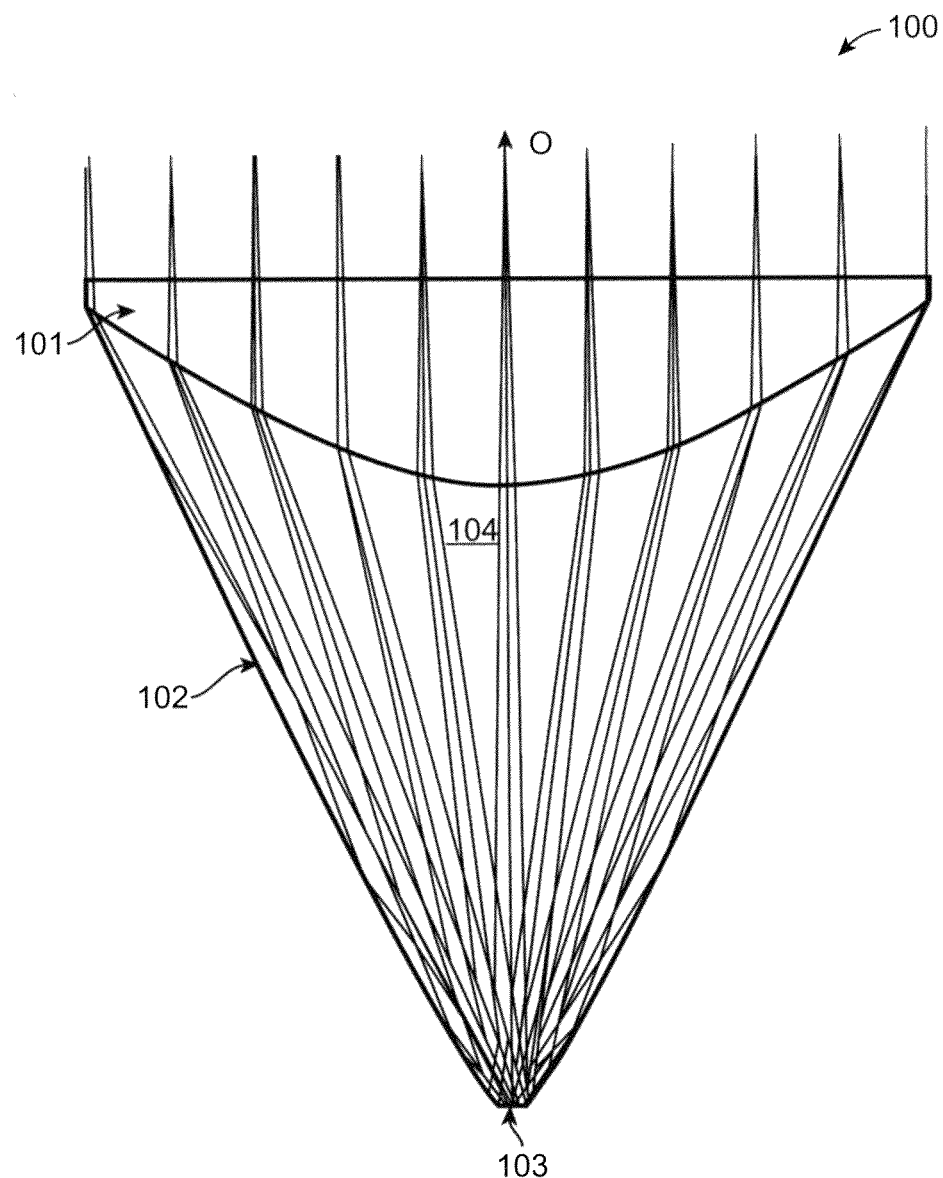
FIG. 6 is a cross section of a concentrator.

Referring to FIG. 6, concentrator 100 includes concentrating lens 101 mounted in the wide end of tapering reflector 102. Receiver 103 (in this example a photovoltaic cell) is mounted at the narrow end of the reflector 102. Thus, the interior volume 104 of reflector 101 is sealed, protecting receiver 103. Interior volume 104 may be evacuated, or may be filled with a fluid (e.g. a transparent refractive fluid) or solid (e.g. a solid refractive dielectric). In cases where interior volume 104 is filled with a fluid, a circulator (not shown) may be provided in fluid communication (e.g. through one or more ports in reflector 102) with interior volume 104. The circulator may circulate the fluid to remove heat from concentrator 100. It may further include a heat exchanger which extracts heat from the circulating fluid. This heat may be used, e.g., to generate electrical power, generate steam power, provide home heating, etc.

As indicated by the ray traces in FIG. 6, a first portion of the light passing through lens 101 is refracted and directed to receiver 103 without reflecting from reflector 102. A second portion of the light passing through lens 101 is refracted and reflects from reflector 102 onto receiver 103.

For example, as shown in FIG. 6, rays which enter the central portion of lens 101 at relatively small angle of incidence from normal incidence make up the first portion of light which impinges directly on cell 103. Rays which enter the peripheral portion of lens 101 and/or are incident at relatively large angle of incidence from normal make up the second portion of light which reflects from reflector 102 before impinging on receiver 103.

Figure 6A:
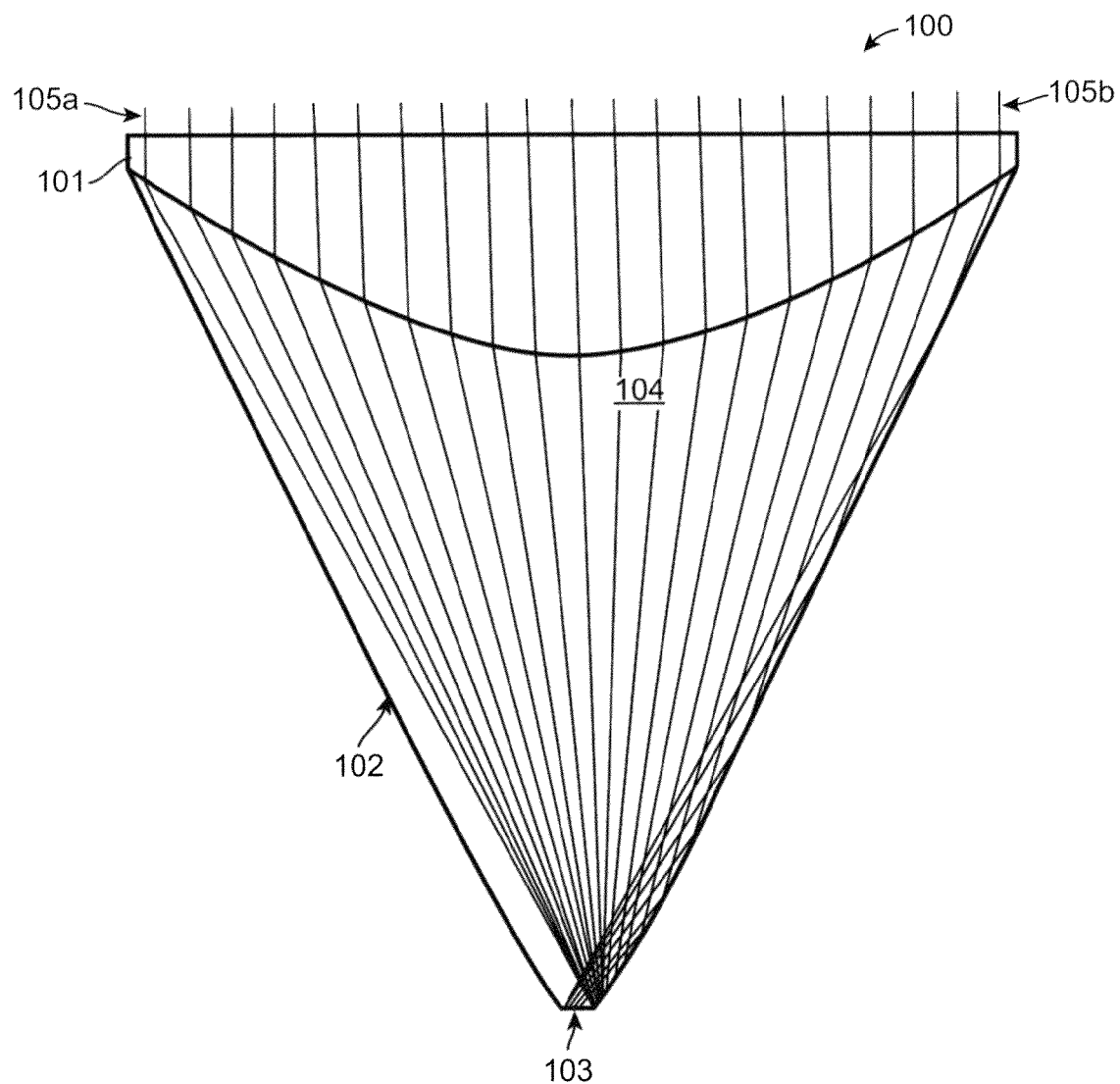
FIG. 6a is a cross section of a concentrator.

FIG. 6a is an illustration of concentrator 100 only showing light rays belonging to the second portion of light, which reflects from reflector 102 before impinging on receiver 103. Note that the rays 105a and 105b are reflected onto the edges of receiver 103, while the remaining rays are directed to points on receiver 103 between the edges. The rays illustrated reflect off one side of reflector 102, but of course a symmetric set of rays could be drawn which reflect off the opposite side.

In some embodiments, concentrator 100 is advantageous in that it can provide good performance while being much shorter than conventional concentrators, e.g., compound parabolic concentrators (CPCs).

Figure 7:
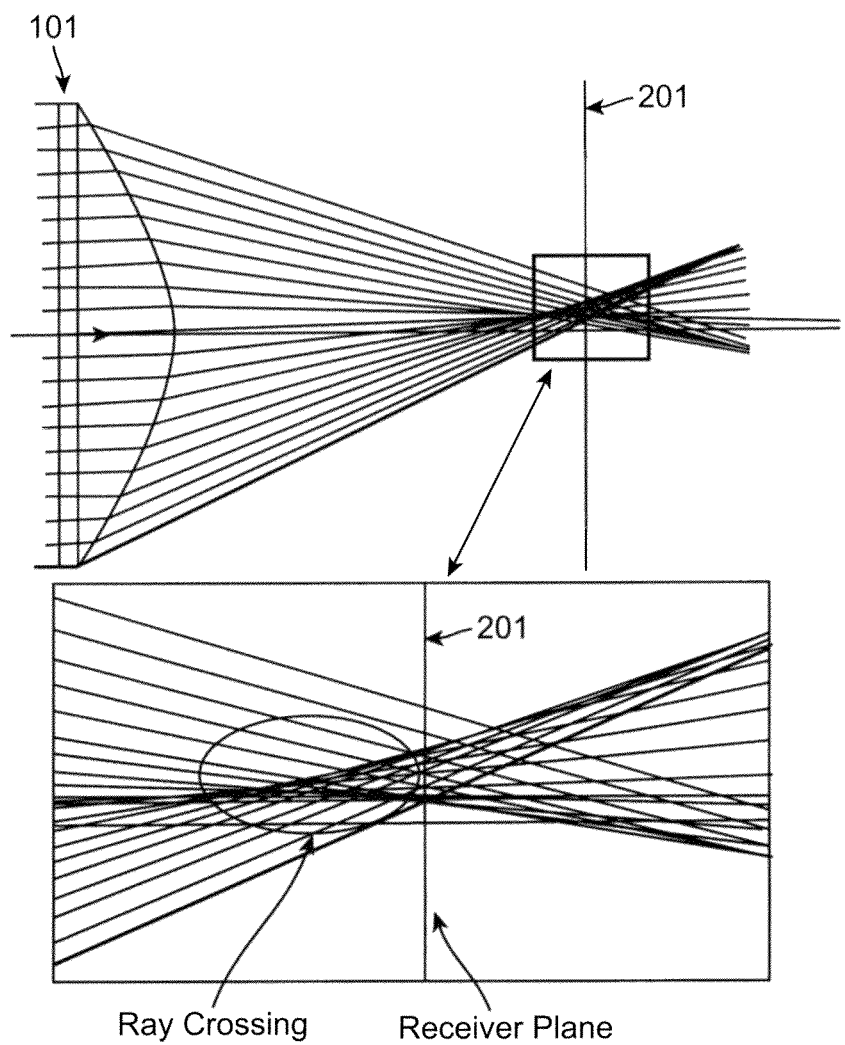
FIG. 7 is a ray trace illustration for a concentrating lens with inset showing detail.

In some embodiments, concentrating lens 101 may be a singlet lens. As is known in the art, fast singlet lens often have coma. For example, FIG. 7 is a ray trace of a typical fast singlet concentrating lens. Note that, as shown, reflector 102 is not present in the figure. The plane 201 corresponds to the desired location of receiver 103. However, as detailed in the inset, the coma of lens 101 results in ray crossings which occur in front of the receiver plane. Rays which cross in this fashion cannot be suitably concentrated by a reflector to the receiver 103 in receiver plane 201. The reason for this is that a mirror cannot reflect two rays which have already crossed to a single point.

Figure 8:
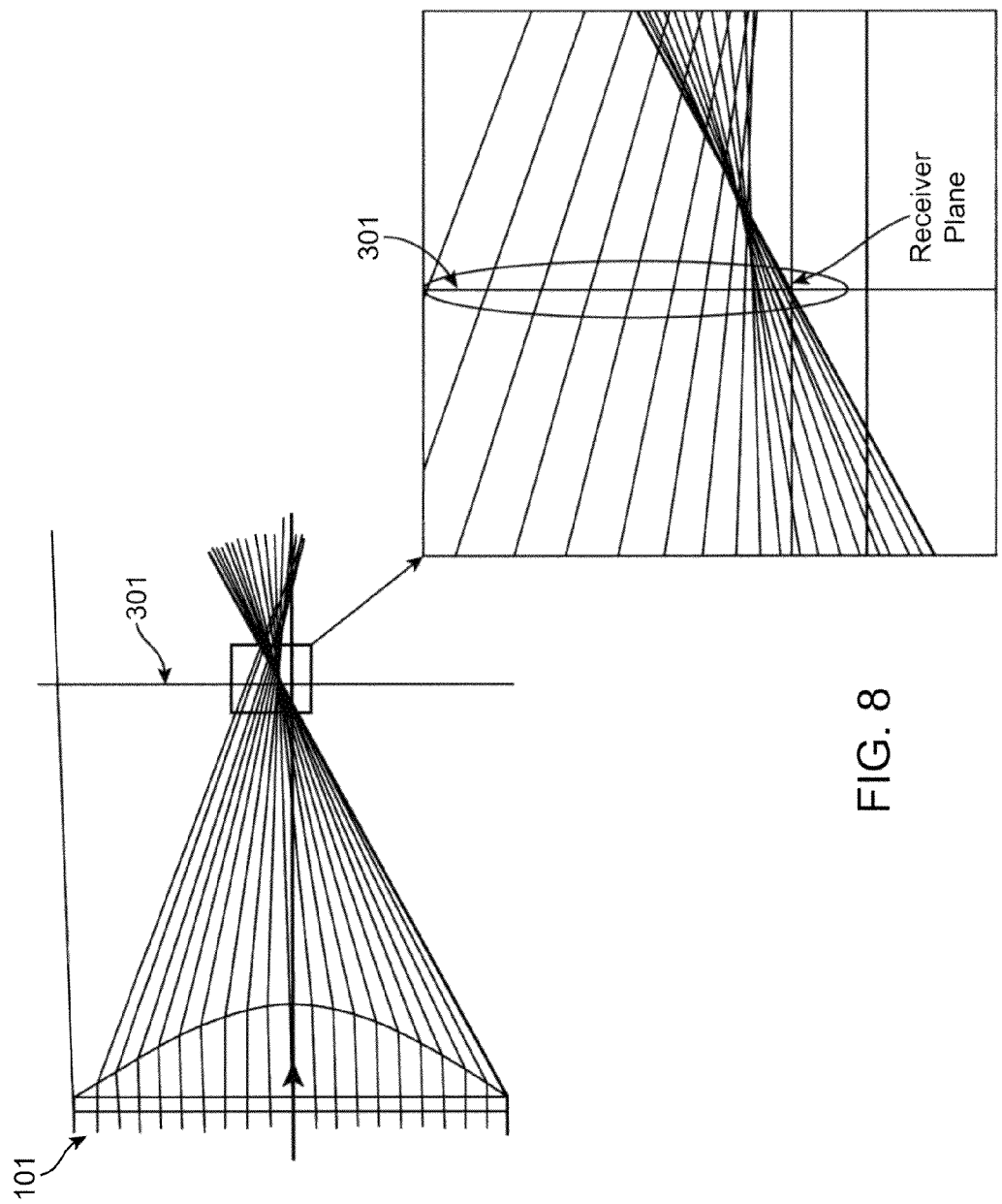
FIG. 8 is a ray trace illustration for a concentrating lens with inset showing detail.

In some embodiments, a slow lens having low coma can be used to avoid the problem of ray crossing. However, typically such designs will require a longer concentrator than those featuring a fast lens. FIG. 8 illustrates another solution to the ray crossing problem that does not require a slow, substantially coma-free lens. As shown, lens 101 is designed in such a way that rays cross the receiver plane incrementally, i.e., incident rays with smaller y coordinates (vertical direction in the figure) cross the points with smaller y value on the receiver plane. Thus although coma still exists and may be large, no rays cross before the receiver plane. Accordingly, the rays can be well concentrated by reflector 102.

Figure 9:
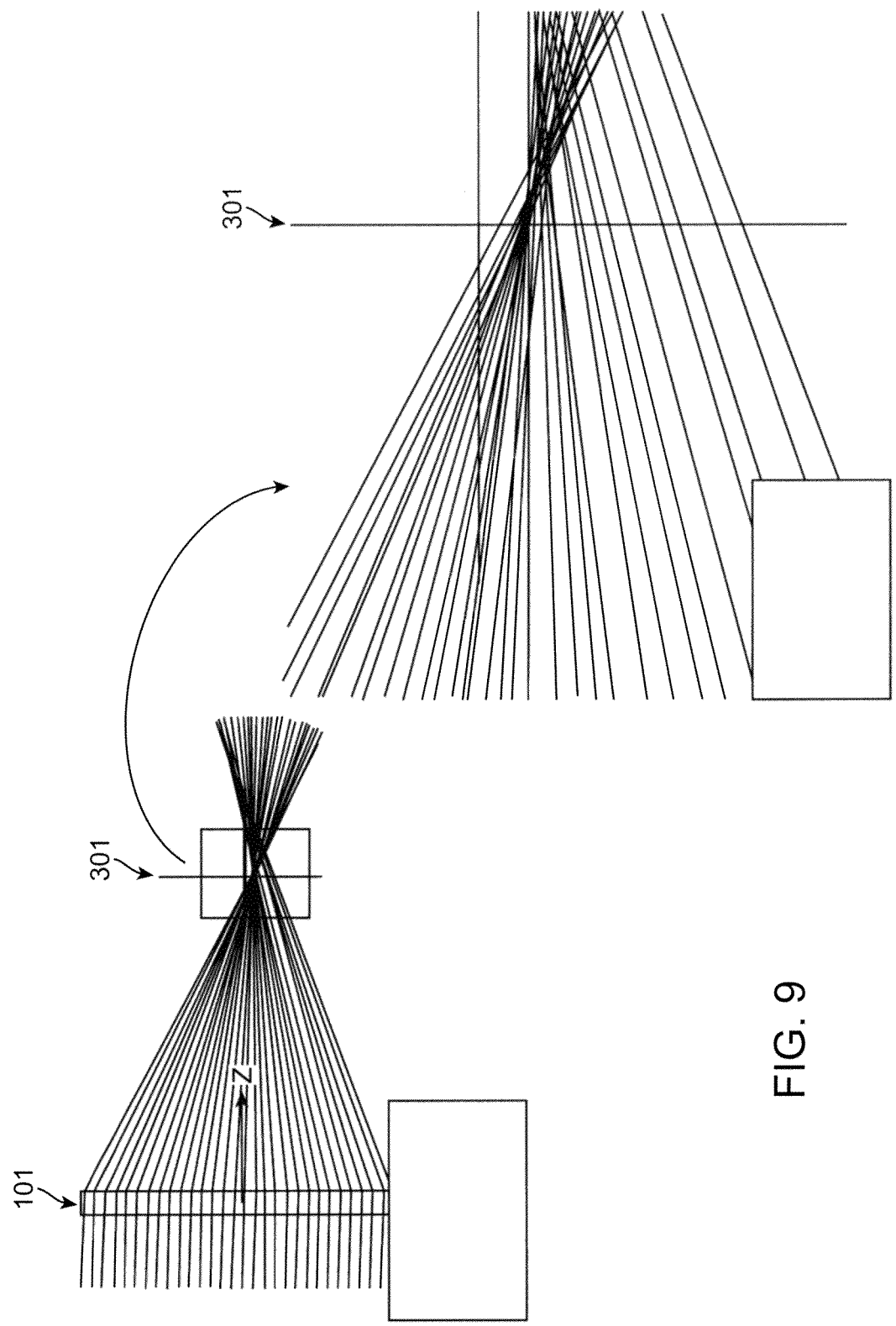
FIG. 9 is ray trace illustration for a concentrating Fresnel lens with inset showing detail.
Figure 10:
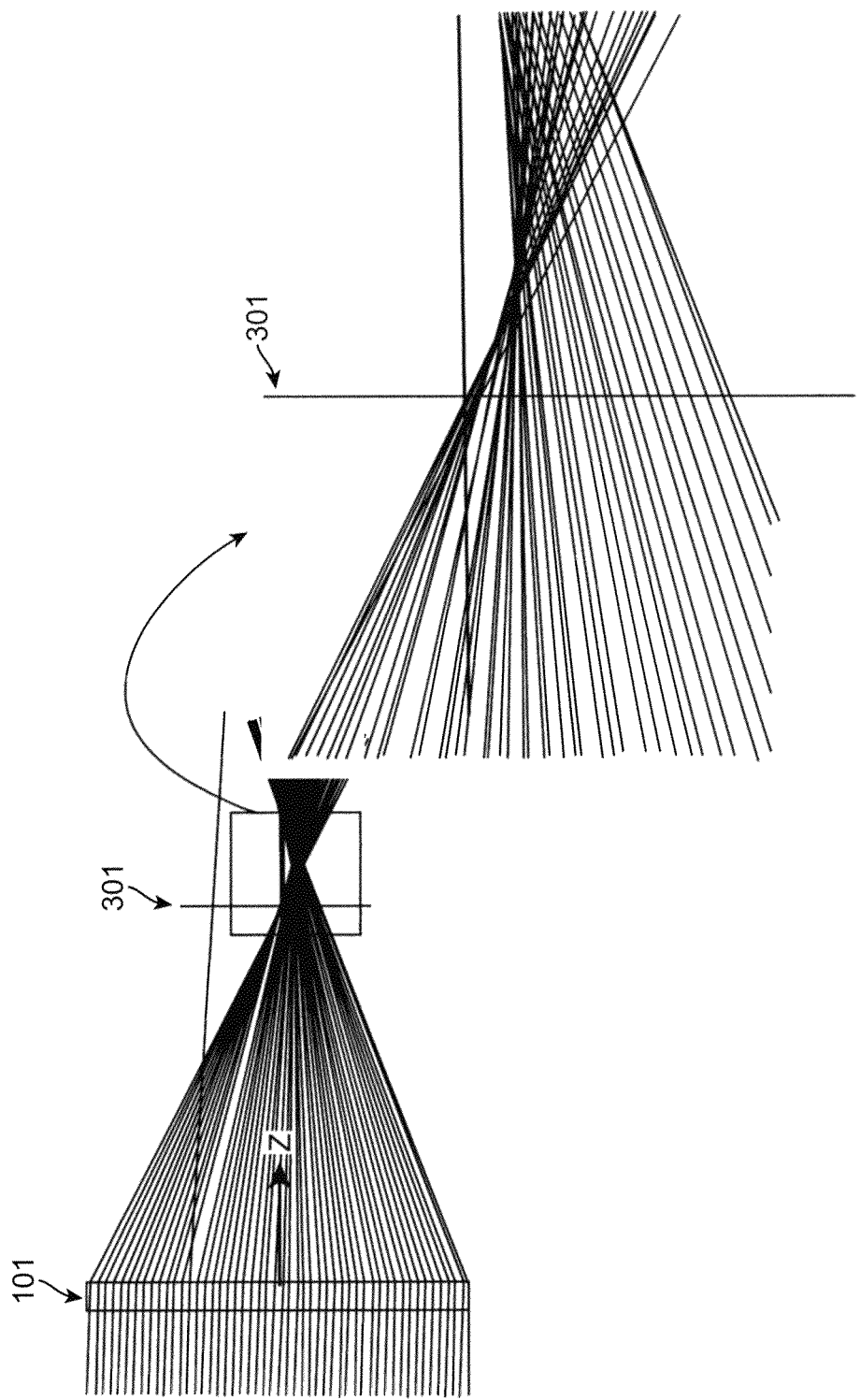
FIG. 10 is ray trace illustration for a concentrating Fresnel lens with inset showing detail.

Conventional fast lenses may be thick and bulky, and may require a lot of material and be difficult to manufacture. Accordingly, in some embodiments, lens 101 may be constructed as a Fresnel lens. Advantageously, Fresnel lenses may be thinner and require less material than conventional lenses. FIGS. 9 and 10 show ray traces of exemplary Fresnel lenses suitable for use in concentrator 100. Note that in each case, ray crossing in front of receiver plane 103 is minimized or eliminated.

In some embodiments, concentrator 100 is a three dimensional concentrator with high geometric concentration (e.g. geometric concentration of 100, 500, 1000, or more). For example, FIGS. 11a-c illustrate an embodiment of concentrator 100 which is rotationally symmetric about optic axis O. Lens 101 is a circular lens, and reflector 102 is a truncated substantially conical surface. Exemplary dimensions for one embodiment are shown in FIG. 11c, but it is to be understood that other dimensions may be used.

Figures 12, 13:
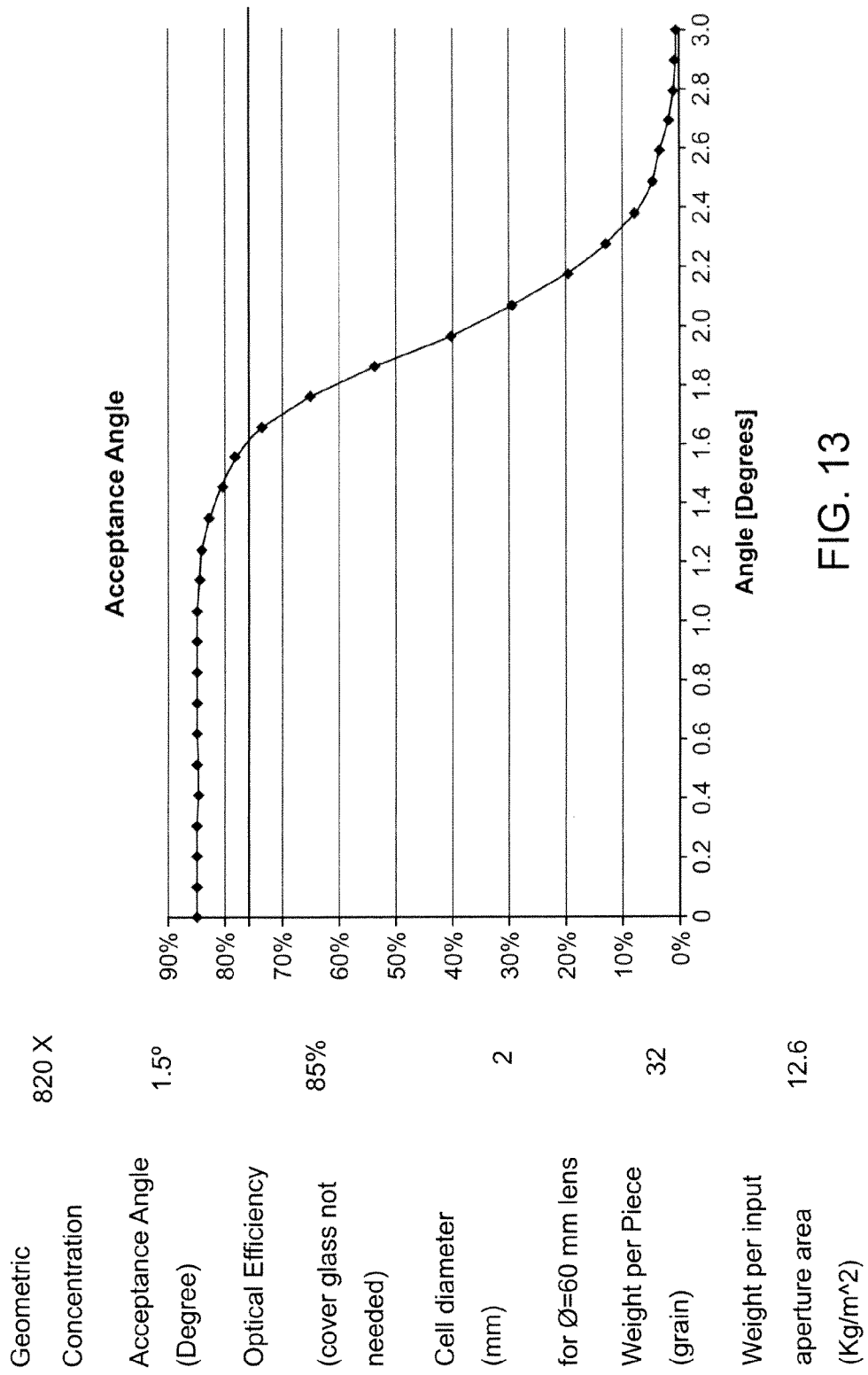
FIG. 12 is a chart of characteristics of the concentrator of FIGS. 11a-11c.
FIG. 13 is a plot of optical efficiency vs angle of incidence for the concentrator of FIGS. 11a-11c.

Referring to FIGS. 12 and 13, the embodiment of concentrator 100 shown in FIGS. 11a-c may have a geometric concentration of 820 with an acceptance angle of 1.5 degrees or more. Concentrator 100 operates with an optical efficiency of 85% or more for light incident at angles less than the acceptance angle. Other embodiments may have other performance characteristics. In some embodiments, the geometric concentration may be greater than 500, greater than 750, greater than 1000, or even more. The optical efficiency may be greater than 70%, 80%, 90%, or more. The acceptance angle may be greater than 1 degree, 1.5 degrees, 2.0, degrees or more.

Figures 14A, 14B:
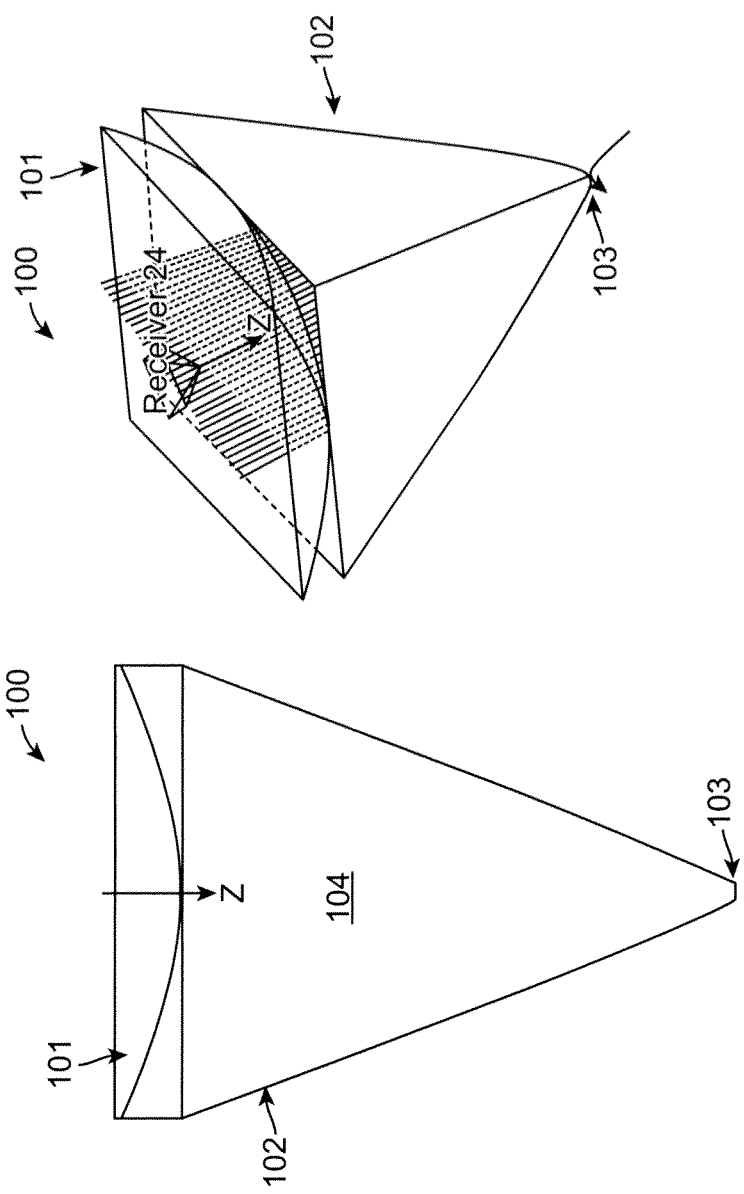
Figure 16:
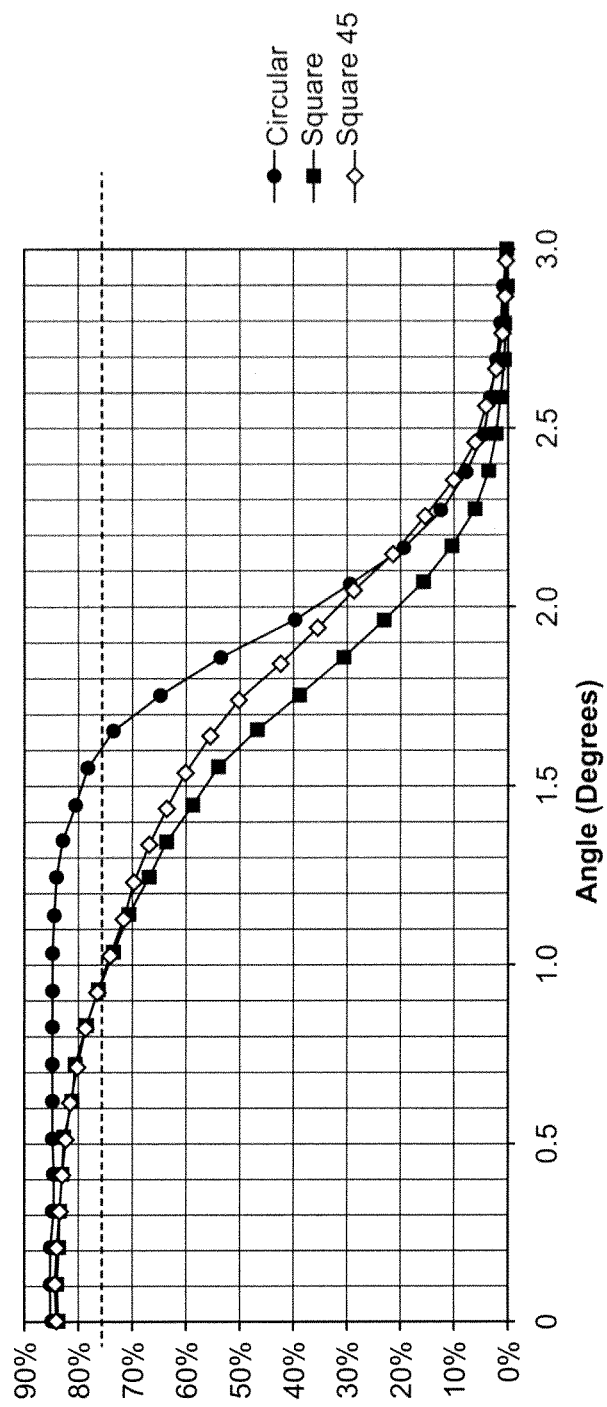
FIG. 16 is a plot of optical efficiency vs angle of incidence for the concentrator of FIGS. 11a-11c and the concentrator of FIGS. 14a-14c.

FIGS. 14a-b illustrate an embodiment of concentrator 100 featuring a three dimensional square pyramidal geometry. Lens 101 is a square lens, and reflector 102 is a truncated substantially square pyramidal surface. Referring to FIGS. 15 and 16, the performance of this square concentrator is comparable to that of the circular concentrator of FIGS. 11a-c.

FIG. 14c illustrates another embodiment 101b of square lens 101. The four corners of square lens 101b are rounded. In some embodiments, the four side surfaces of the square lens 101b are parallel to the optic axis Z. In some embodiments, the four side surfaces of the square lens 101b tilt downwards towards the optic axis Z such that they match the substantially square pyramidal surface of reflector 102.

The embodiment of concentrator 100 shown in FIGS. 14a-b may have a geometric concentration of 820 with an acceptance angle of about 1.0 degrees or more. Concentrator 100 operates with an optical efficiency of about 84% or more for light incident at angles less than the acceptance angle. For example, FIG. 16 shows the optical efficiency of the concentrators as a function of angle of incidence. In the case of the square concentrator, efficiency is plotted for angles along the direction of a side of square lens 100 and in the direction along the diagonal of square lens 100.

Other embodiments of the square concentrator may have other performance characteristics. In some embodiments, the geometric concentration may be greater than 500, greater than 750, greater than 1000, or even more. The optical efficiency may be greater than 70%, 80%, 90%, or more. The acceptance angle may be greater than 1 degree, 1.5 degrees, 2.0, degrees or more.

Figure 17A:
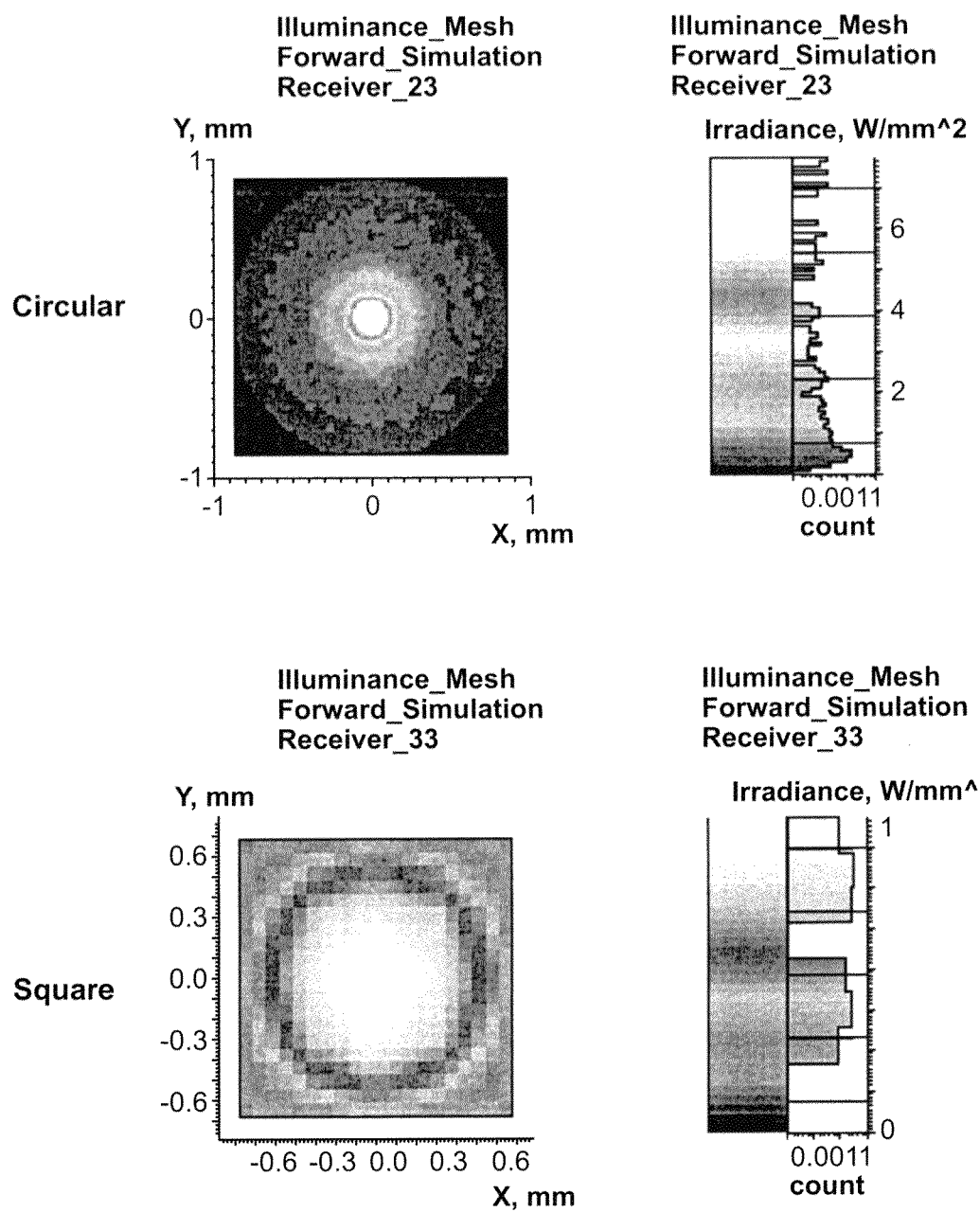
FIGS. 17a and 17b illustrate and compare the irradiance patterns for the concentrator of FIGS. 11a-11c and the concentrator of FIGS. 14a-14c.
Figure 17B:
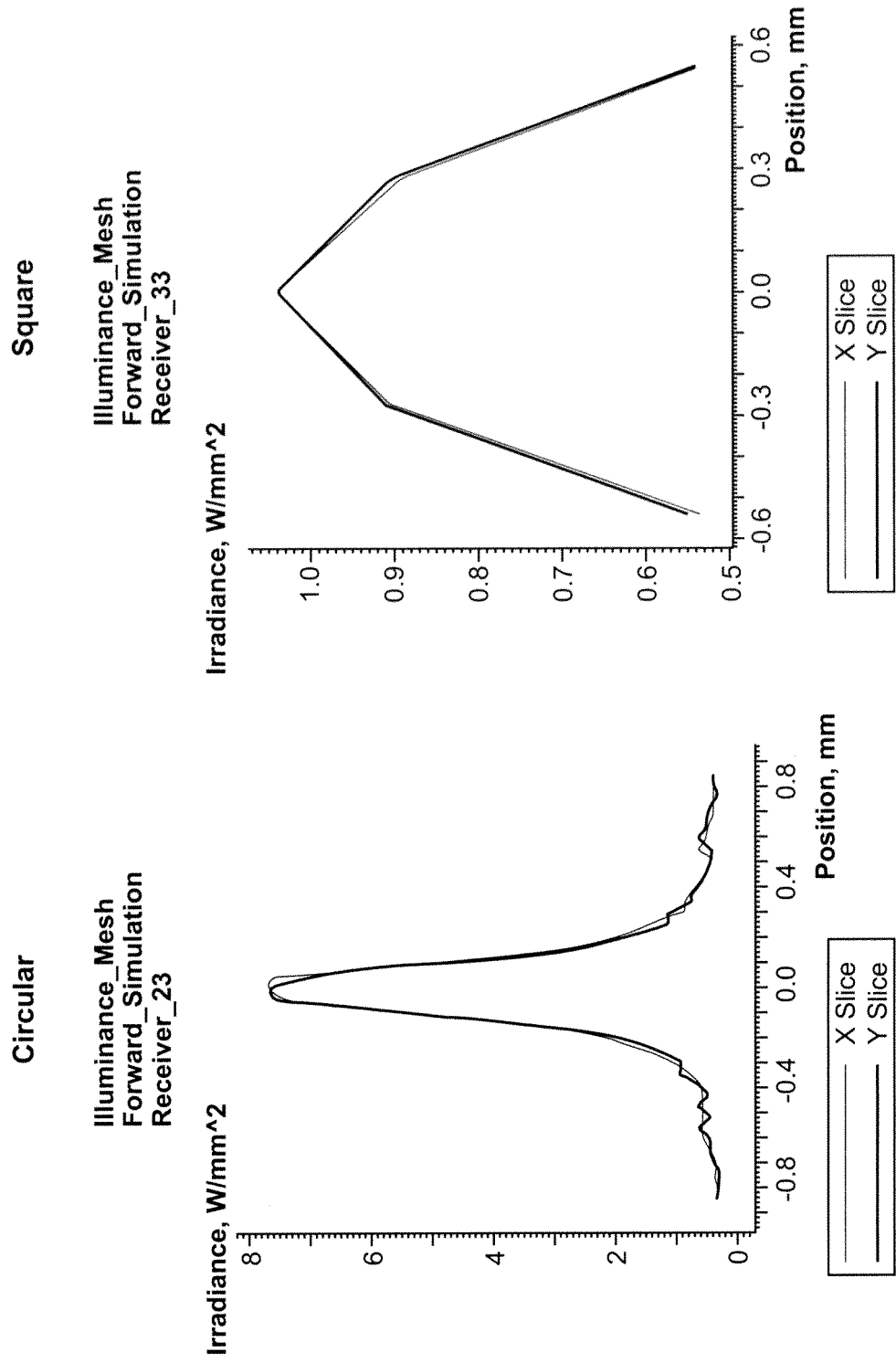

FIGS. 17a and 17b compare the irradiance pattern produced at receiver 103 for the circular concentrator of FIGS. 11a-c and the square concentrator of FIGS. 14a-b. Note that for the square concentrator, the irradiance of receiver 103 is less peaked at the center of the cell. Thus, square concentrator may be used advantageously in application where it is beneficial to "spread out" the irradiance more uniformly across receiver 103. For example, in some embodiments, for the square concentrator (or a similar concentrator using another shape which is rotationally asymmetric about the optic axis), the ratio of the peak concentration on the cell to the average concentration over the cell may be 5.0 or less, 4.0 or less, 3.0 or less, 2.0 or less, or even about 1.0 (corresponding to uniform illumination). As is known in the art, many types of solar cells and other optical devices operate more efficiently when uniformly illuminated.

Although specific examples of circular and square three dimensional high concentration concentrators have been discussed, it is to be understood that, in various embodiments, any other suitable shapes may be used.

In some embodiments, these concentrators may be used, e.g., in solar collection applications where they are mounted on a solar tracking system of any kind known in the art.

Figure 18B:
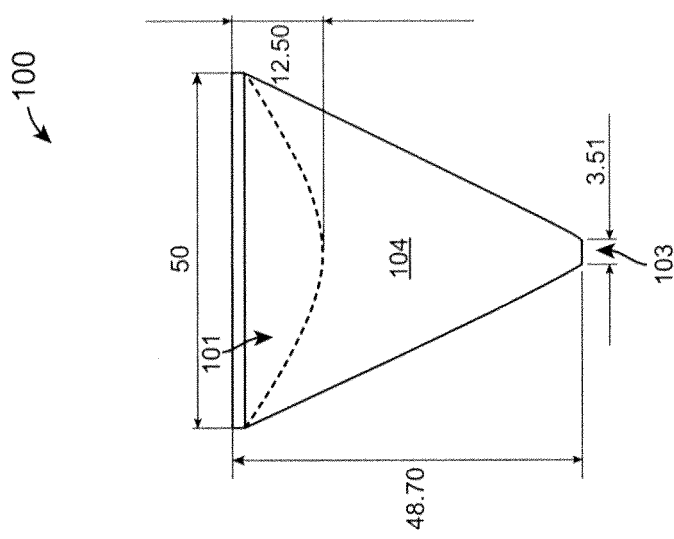
FIG. 18a-18b illustrate a two dimensional concentrator with a trough shaped reflector.
Figure 18A:
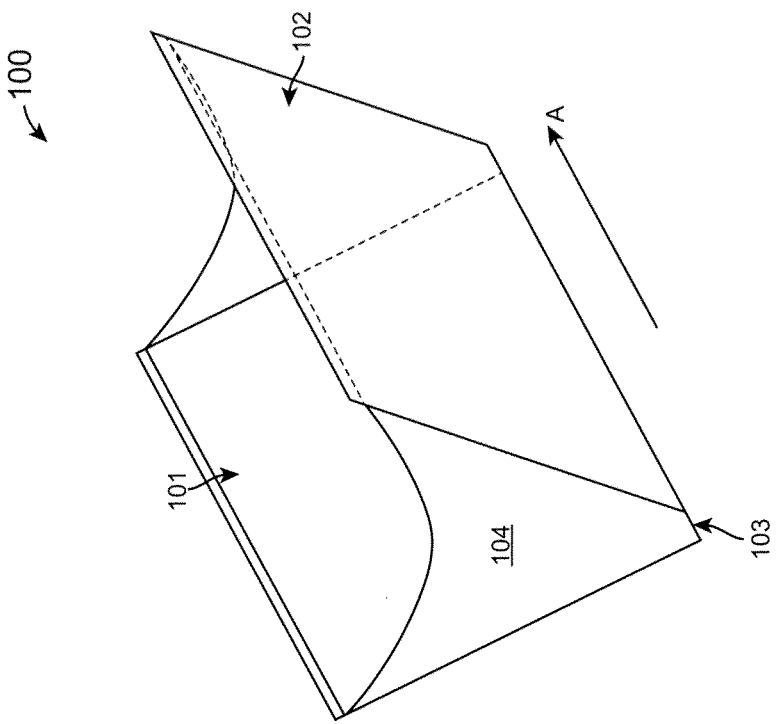

In some embodiments, concentrator 100 is a two dimensional concentrator with low geometric concentration (e.g., geometric concentration of 20 or less, 10 or less, 5 or less, etc.). For example, FIGS. 18a and 18b show concentrator 100, in which reflector 102 is a trough shaped reflector which extends along a longitudinal axis A (e.g. for 100 mm or less or more) and tapers vertically from a wide top to a narrow bottom. For solar collection applications, longitudinal axis A may be arranged along a North-South direction.

Concentrating lens 101 is a cylindrical type lens which extends along axis A, and is mounted in the wide top of trough shaped reflector 102. Concentrator 100 acts to concentrate light to an elongated region extending along the narrow bottom of the trough. Receiver 103 is positioned in or near this elongated region, and may also extend along the longitudinal axis, as shown.

Referring to FIGS. 19 and 20, the embodiment of concentrator 100 shown in FIGS. 18a-b may have a geometric concentration of 14 with an acceptance angle of 23 degrees or more along the longitudinal direction (indicated as N.S. in the figures) and of 2.6 degrees in the lateral direction (i.e. transverse to the plane or symmetry of the trough, indicated as E.W in the figures). Concentrator 100 operates with an optical efficiency of 87.6% or more for light incident at angles less than the acceptance angle.

Other embodiments may have other performance characteristics. In some embodiments, the geometric concentration may be greater 5, greater than 10, or even more. The optical efficiency may be greater than 70%, 80%, 90%, or more. The acceptance angle may be greater than 1 degree, 2 degrees, 3, degrees or more in the longitudinal direction.

In some embodiments, light from a source incident on the concentrating lens 101 at an angle of incidence within at least about 1 degree from normal to the lens in the lateral direction and within at least about 20 degrees from normal to the lens in the longitudinal direction is concentrated to the concentration region with an efficiency of greater than about 85% and with an geometrical concentration ratio of about 10 or greater.

Note that, because the two dimensional concentrator generally has a wider acceptance angle than a high concentration device, it may be more suitable in solar collection applications where no or limited tracking is available.

Reflector 102 may be formed, e.g., from stamped metal such as aluminum (or any other metal suitable for forming a reflective surface). In other embodiments, reflector 102 is formed as a metallized coating on a refractive material (e.g. a coating including gold or silver or aluminum, or any other reflective coating known in the art). In some embodiments, some or all of reflector 102 may operate by total internal reflection.

Although the specific examples described above have dealt with concentrating radiation from a relatively large solid angle of incidence onto a relatively small target (e.g. concentrating solar light onto a solar cell), it will be understood that they may equally well be applied to broadcasting radiation from a relatively small source to a relatively large solid angle (e.g. collecting light from an LED chip to form a beam or sheet of light). The small source may, for example, include a light emitting diode, an organic light emitting diode, a laser, or a lamp.

One or more or any part thereof of the techniques described herein can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein. In some embodiments, the computer readable media is tangible and substantially non-transitory in nature, e.g., such that the recorded information is recorded in a form other than solely as a propagating signal.

Note that as used herein, an acceptance angle should be taken as symmetric about zero, i.e., a device with an acceptance angle of 5 will accept light rays at angles ranging from −5 degrees to +5 degrees.

A number of embodiments of the invention have been described. Nevertheless, it will be understood that various modifications may be made without departing from the spirit and scope of the invention.

As used herein the term "light" and related terms (e.g. "optical") are to be understood to include electromagnetic radiation both within and outside of the visible spectrum, including, for example, ultraviolet and infrared radiation.

In general, concentrators of the type described herein may be designed by appropriate application of the "edge-ray" principal, e.g., as described in Roland Winston et al, Nonimaging Optics, Academic Press (Elsevier) 2005.

U.S. patent application Ser. No. 12/036,825 filed Feb. 25, 2008, and U.S. Provisional Application Ser. No. 60/891,447 filed Feb. 23, 2007, are incorporated herein by reference in their entirety.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An optical device, comprising:
a non-imaging secondary concentrator having an entry aperture and an exit aperture, and configured to receive light focused by a primary focusing element from a source onto the entry aperture, wherein the non-imaging secondary concentrator comprises:
a first portion proximal the entry aperture; and
a second portion proximal the exit aperture which is not rotationally symmetric about an optic axis; and
further comprising a means for homogenizing the light focused onto the entry aperture of the secondary concentrator.

2. The device of claim 1, further comprising a receiver located proximal to the exit aperture of the secondary concentrator.

3. The device of claim 2, wherein the receiver is optically coupled to the exit aperture of the secondary concentrator.

4. The device of claim 2, wherein the second portion extends and tapers along the optic axis from a wide end proximal the first portion to a narrow end comprising the exit aperture.

5. The device of claim 4, wherein the shape of the exit aperture corresponds to the shape of the receiver.

6. The device of claim 5, wherein the receiver is square shaped, and the second portion of the non-imaging secondary concentrator comprises a truncated substantially square pyramidal portion, which extends and tapers along the optic axis from a wide end proximal the first portion to a narrow end comprising the exit aperture.

7. The device of claim 1, wherein the non-imaging secondary concentrator is composed of a transparent dielectric material.

8. The device of claim 7, wherein the non-imaging secondary concentrator operates by total internal reflection.

9. The device of claim 8, wherein the non-imaging secondary concentrator operates by both total internal reflection and specular reflection.

10. The device of claim 1, wherein the secondary concentrator includes a compound parabolic concentrator (CPC).

11. The device of claim 10, wherein the first portion of the non-imaging secondary concentrator comprises a spherical or aspheric-shaped entrance aperture.

12. The device of claim 11, further comprising a means for homogenizing the light focused onto the entry aperture of the secondary concentrator.

13. The device of claim 12, wherein the primary focusing element includes a diffractive lens.

14. The device of claim 1, wherein the secondary concentrator includes an angle transformer.

15. The device of claim 1, further comprising the primary focusing element.

16. The device of claim 15, wherein the primary focusing element has an f-number that is greater than about 0.9.

17. The device of claim 16, wherein the primary focusing element includes a Fresnel lens.

18. The device of claim 17, wherein the Fresnel lens is flat.

19. The device of claim 17, wherein the Fresnel lens is substantially square.

20. The device of claim 17, wherein the Fresnel lens is curved.

21. The device of claim 15, wherein the primary focusing element has an f-number that is greater than about 1.5.

22. The device of claim 15, wherein the primary focusing element includes a Fresnel reflector.

23. The device of claim 15, wherein the primary focusing element includes a diffractive lens.

24. The device of claim 23, wherein the first portion proximal the entry aperture is rotationally symmetric about the optic axis.

25. The device of claim 23, wherein the first potion proximal the entry aperture is squared off or trimmed.

26. The device of claim 23, wherein the entry aperture is substantially square with rounded corners.

27. The device of claim 1, wherein the secondary concentrator has an f-number of 0.5 or less.

28. The device of claim 1, wherein the secondary concentrator has an f-number of 1.0 or less.

29. The device of claim 1, wherein the first portion proximal the entry aperture is rotationally symmetric about the optic axis.

30. The device of claim 1, wherein the first potion proximal the entry aperture is squared off or trimmed.

31. The device of claim 1, wherein the entry aperture is substantially square with rounded corners.

32. An optical device, comprising:
a non-imaging secondary concentrator having an entry aperture and an exit aperture, and configured to receive light focused by a primary focusing element from a source onto the entry aperture, wherein the non-imaging secondary concentrator comprises:
a first portion proximal the entry aperture; and
a second portion proximal the exit aperture which is not rotationally symmetric about an optic axis; and
a receiver located proximal to the exit aperture of the secondary concentrator;
wherein the optical device satisfies at least one of the following conditions:
(a) the device further comprises the primary focusing element, the primary focusing element having an f-number that is greater than about 0.9; and (b) wherein the secondary concentrator has an f-number of 1.0 or less.

33. The device of claim 32, the optical device satisfies condition (a).

34. The device of claim 33, wherein the primary focusing element has an f-number that is greater than about 1.5.

35. The device of claim 33, wherein the primary focusing element includes a Fresnel lens.

36. The device of claim 35, wherein the Fresnel lens is flat.

37. The device of claim 35, wherein the Fresnel lens is substantially square.

38. The device of claim 35, wherein the Fresnel lens is curved.

39. The device of claim 38, wherein the primary focusing element includes a diffractive lens.

40. The device of claim 33, wherein the first portion proximal the entry aperture is rotationally symmetric about the optic axis.

41. The device of claim 33, wherein the first potion proximal the entry aperture is squared off or trimmed.

42. The device of claim 33, wherein the entry aperture is substantially square with rounded corners.

43. The device of claim 32, wherein the device satisfies condition (b).

44. The device of claim 32, wherein the secondary concentrator has an f-number of 0.5 or less.

45. The device of claim 32, wherein the first portion proximal the entry aperture is rotationally symmetric about the optic axis.

46. The device of claim 32, wherein the first potion proximal the entry aperture is squared off or trimmed.

47. The device of claim 32, wherein the entry aperture is substantially square with rounded corners.

48. An optical device, comprising:
a non-imaging secondary concentrator having an entry aperture and an exit aperture, and configured to receive light focused by a primary focusing element from a source onto the entry aperture;
wherein the non-imaging secondary concentrator comprises:
a first portion proximal the entry aperture; and
a second portion proximal the exit aperture which is not rotationally symmetric about an optic axis,
wherein the secondary concentrator includes a compound parabolic concentrator (CPC);
wherein the first portion of the non-imaging secondary concentrator comprises a spherical or aspheric-shaped entrance aperture, and
wherein the primary focusing element includes a Fresnel reflector.

* * * * *